United States Patent
Nelson et al.

(10) Patent No.: US 10,081,098 B1
(45) Date of Patent: Sep. 25, 2018

(54) GENERALIZED COORDINATE SURROGATES FOR INTEGRATED ESTIMATION AND CONTROL

(71) Applicant: Boston Dynamics, Inc., Waltham, MA (US)

(72) Inventors: Gabriel Nelson, Waltham, MA (US); Benjamin Stephens, Somerville, MA (US)

(73) Assignee: Boston Dynamics, Inc., Waltham, MA (US)

( * ) Notice: Subject to any disclaimer, the term of this patent is extended or adjusted under 35 U.S.C. 154(b) by 63 days.

(21) Appl. No.: 14/834,855

(22) Filed: Aug. 25, 2015

Related U.S. Application Data

(60) Provisional application No. 62/041,275, filed on Aug. 25, 2014.

(51) Int. Cl.
  *B25J 9/16* (2006.01)
  *B62D 57/032* (2006.01)
  *B25J 5/00* (2006.01)

(52) U.S. Cl.
  CPC .............. *B25J 5/00* (2013.01); *B25J 9/1666* (2013.01); *B25J 9/1682* (2013.01); *Y10S 901/01* (2013.01)

(58) Field of Classification Search
  CPC .... B62D 57/024; B62D 57/032; B62D 57/02; B25J 5/00; B25J 9/1633; B25J 9/1674; B25J 19/002; B25J 13/088; B25J 13/085; B25J 9/0003; B25J 9/16; B25J 9/1605; G05D 1/0891; G05D 1/0088; G05D 2201/0217; G05D 1/021; G01C 21/26;
  (Continued)

(56) References Cited

U.S. PATENT DOCUMENTS 4,834,200 A * 5/1989 Kajita .................. B62D 57/02
                                                      180/8.1
5,151,859 A   9/1992 Yoshino et al.
5,355,064 A   10/1994 Yoshino et al.
(Continued)

FOREIGN PATENT DOCUMENTS

KR     100815247     3/2008

OTHER PUBLICATIONS

Abe et al., "Multiobjective Control with Frictional Contacts," Eurographics/ACM SIGGRAPH Symposium on Computer Animation, Aug. 4-5, 2007, San Diego, California, 10 pages.
(Continued)

*Primary Examiner* — Stephen Holwerda
(74) *Attorney, Agent, or Firm* — Honigman Miller Schwartz and Cohn LLP

(57) ABSTRACT

A robotic device includes a control system. The control system receives a first measurement indicative of a first distance between a center of mass of the machine and a first position in which a first leg of the machine last made initial contact with a surface. The control system also receives a second measurement indicative of a second distance between the center of mass of the machine and a second position in which the first leg of the machine was last raised from the surface. The control system further determines a third position in which to place a second leg of the machine based on the received first measurement and the received second measurement. Additionally, the control system provides instructions to move the second leg of the machine to the determined third position.

14 Claims, 12 Drawing Sheets

(58) Field of Classification Search
CPC . G01C 19/5705; Y10S 901/01; Y10S 901/28; Y10S 901/02
See application file for complete search history.

(56) References Cited

U.S. PATENT DOCUMENTS

| | | | |
|---|---|---|---|
| 5,357,433 | A * | 10/1994 | Takenaka ............ B62D 57/032 180/8.1 |
| 5,369,346 | A * | 11/1994 | Takahashi ............ B62D 57/032 180/8.1 |
| 5,416,393 | A | 5/1995 | Gomi et al. |
| 5,432,417 | A | 7/1995 | Takenaka et al. |
| 5,459,659 | A | 10/1995 | Takenaka |
| 5,644,204 | A | 7/1997 | Nagle |
| 5,737,217 | A | 4/1998 | Nishikawa et al. |
| 5,808,433 | A | 9/1998 | Tagami et al. |
| 5,838,130 | A | 11/1998 | Ozawa |
| 5,929,585 | A * | 7/1999 | Fujita ............... B62D 57/032 318/568.11 |
| 5,974,366 | A | 10/1999 | Kawai et al. |
| 6,064,167 | A | 5/2000 | Takenaka et al. |
| 6,177,776 | B1 | 1/2001 | Kawai et al. |
| 6,374,157 | B1 | 4/2002 | Takamura |
| 6,484,068 | B1 | 11/2002 | Yamamoto et al. |
| 6,493,607 | B1 | 12/2002 | Bourne et al. |
| 6,802,382 | B2 | 10/2004 | Hattori et al. |
| 6,943,520 | B2 | 9/2005 | Furuta et al. |
| 6,992,455 | B2 | 1/2006 | Kato et al. |
| 6,992,457 | B2 | 1/2006 | Furuta et al. |
| 6,999,851 | B2 | 2/2006 | Kato et al. |
| 7,013,201 | B2 | 3/2006 | Hattori et al. |
| 7,076,331 | B1 | 7/2006 | Nagatsuka et al. |
| 7,120,518 | B2 | 10/2006 | Takenaka et al. |
| 7,236,852 | B2 | 6/2007 | Moridaira et al. |
| 7,386,364 | B2 | 6/2008 | Mikami et al. |
| 7,603,234 | B2 | 10/2009 | Takenaka et al. |
| 7,606,634 | B2 | 10/2009 | Takenaka et al. |
| 7,643,903 | B2 | 1/2010 | Kawai |
| 7,657,345 | B2 | 2/2010 | Endo et al. |
| 7,734,377 | B2 | 6/2010 | Hasegawa |
| 7,734,378 | B2 | 6/2010 | Takenaka et al. |
| 7,881,824 | B2 | 2/2011 | Nagasaka et al. |
| 7,949,430 | B2 | 5/2011 | Pratt et al. |
| 8,060,253 | B2 | 11/2011 | Goswami et al. |
| 8,108,070 | B2 | 1/2012 | Tajima |
| 8,172,013 | B2 | 5/2012 | Shimada |
| 8,195,332 | B2 | 6/2012 | Pratt et al. |
| 8,239,084 | B2 | 8/2012 | Yamamoto et al. |
| 8,306,657 | B2 | 11/2012 | Yoshiike et al. |
| 8,311,731 | B2 | 11/2012 | Sugiura |
| 8,332,068 | B2 | 12/2012 | Goswami et al. |
| 8,386,076 | B2 | 2/2013 | Honda et al. |
| 8,396,593 | B2 | 3/2013 | Orita |
| 8,417,382 | B2 | 4/2013 | Yoshiike et al. |
| 8,457,830 | B2 | 6/2013 | Goulding |
| 8,498,743 | B2 | 7/2013 | Kwak et al. |
| 8,532,824 | B2 | 9/2013 | Orita |
| 8,565,921 | B2 | 10/2013 | Doi |
| 8,583,283 | B2 | 11/2013 | Takenaka et al. |
| 8,630,763 | B2 | 1/2014 | Goulding |
| 8,688,307 | B2 | 4/2014 | Sekiya |
| 8,738,178 | B2 | 5/2014 | Choi et al. |
| 8,825,391 | B1 | 9/2014 | Urmson et al. |
| 8,849,454 | B2 | 9/2014 | Yun et al. |
| 8,855,820 | B2 | 10/2014 | Watabe |
| 8,855,821 | B2 | 10/2014 | Seo et al. |
| 8,924,021 | B2 | 12/2014 | Dariush et al. |
| 8,948,956 | B2 | 2/2015 | Takahashi et al. |
| 8,965,573 | B2 | 2/2015 | Maisonnier et al. |
| 9,044,862 | B2 | 6/2015 | Kim et al. |
| 9,102,055 | B1 | 8/2015 | Konolige et al. |
| 9,207,678 | B2 | 12/2015 | Kim |
| 9,266,233 | B2 | 2/2016 | Kornbluh et al. |
| 9,317,743 | B2 | 4/2016 | Datta et al. |
| 9,352,470 | B1 | 5/2016 | da Silva et al. |
| 9,446,518 | B1 | | 9/2016 | Blankespoor |
| 2002/0183897 | A1 | | 12/2002 | Kuroki et al. |
| 2003/0009259 | A1 | | 1/2003 | Hattori et al. |
| 2003/0154201 | A1 | | 8/2003 | Berestov |
| 2004/0044440 | A1 | | 3/2004 | Takenaka |
| 2004/0099450 | A1 | | 5/2004 | Kwok et al. |
| 2004/0167641 | A1 | | 8/2004 | Kawai et al. |
| 2004/0172165 | A1 | | 9/2004 | Iribe et al. |
| 2004/0193323 | A1 | | 9/2004 | Higaki et al. |
| 2004/0205417 | A1 | | 10/2004 | Moridaira et al. |
| 2004/0230340 | A1 | | 11/2004 | Fukuchi et al. |
| 2004/0236467 | A1 | | 11/2004 | Sano |
| 2005/0021176 | A1 | | 1/2005 | Takenaka et al. |
| 2005/0038560 | A1 | * | 2/2005 | Nagasaka ............ B62D 57/032 700/245 |
| 2005/0067993 | A1 | | 3/2005 | Kato et al. |
| 2005/0075755 | A1 | | 4/2005 | Takenaka et al. |
| 2005/0077856 | A1 | | 4/2005 | Takenaka et al. |
| 2005/0110448 | A1 | | 5/2005 | Takenaka et al. |
| 2005/0113973 | A1 | | 5/2005 | Endo et al. |
| 2005/0120820 | A1 | | 6/2005 | Takenaka et al. |
| 2005/0216097 | A1 | | 9/2005 | Rifkin |
| 2005/0228539 | A1 | | 10/2005 | Takenaka et al. |
| 2005/0240307 | A1 | | 10/2005 | Kuroki et al. |
| 2006/0064203 | A1 | | 2/2006 | Goto et al. |
| 2006/0076167 | A1 | | 4/2006 | Setrakian et al. |
| 2006/0173578 | A1 | | 8/2006 | Takenaka et al. |
| 2006/0247800 | A1 | | 11/2006 | Takenaka et al. |
| 2007/0003915 | A1 | | 1/2007 | Templeman |
| 2007/0126387 | A1 | | 6/2007 | Takenaka et al. |
| 2007/0150095 | A1 | | 6/2007 | Zaier |
| 2007/0152620 | A1 | | 7/2007 | Takenaka et al. |
| 2007/0156283 | A1 | | 7/2007 | Takenaka |
| 2007/0193789 | A1 | | 8/2007 | Takenaka et al. |
| 2007/0220637 | A1 | | 9/2007 | Endo et al. |
| 2007/0227786 | A1 | | 10/2007 | Hillis et al. |
| 2007/0241713 | A1 | | 10/2007 | Yamamoto et al. |
| 2008/0065269 | A1 | | 3/2008 | Hasegawa |
| 2008/0133055 | A1 | | 6/2008 | Hasegawa |
| 2008/0160873 | A1 | | 7/2008 | Yoneda |
| 2008/0208391 | A1 | | 8/2008 | Hasegawa et al. |
| 2009/0005906 | A1 | | 1/2009 | Tajima |
| 2009/0030530 | A1 | | 1/2009 | Martin |
| 2009/0171503 | A1 | | 7/2009 | Takenaka et al. |
| 2009/0306821 | A1 | | 12/2009 | Park et al. |
| 2009/0312867 | A1 | | 12/2009 | Hasegawa et al. |
| 2009/0325699 | A1 | | 12/2009 | Delgiannidis |
| 2010/0017028 | A1 | | 1/2010 | Suga et al. |
| 2010/0057253 | A1 | | 3/2010 | Kwon et al. |
| 2010/0113980 | A1 | | 5/2010 | Herr et al. |
| 2010/0126785 | A1 | | 5/2010 | Shimada |
| 2010/0161116 | A1 | * | 6/2010 | Kwak ................ B62D 57/032 700/245 |
| 2010/0161120 | A1 | | 6/2010 | Goswami et al. |
| 2010/0161126 | A1 | | 6/2010 | Goswami et al. |
| 2010/0174409 | A1 | | 7/2010 | Park et al. |
| 2010/0252395 | A1 | | 10/2010 | Lehtonen et al. |
| 2010/0277483 | A1 | | 11/2010 | Lee et al. |
| 2010/0292838 | A1 | | 11/2010 | Goswami et al. |
| 2011/0009241 | A1 | | 1/2011 | Lane et al. |
| 2011/0022232 | A1 | | 1/2011 | Yoshiike et al. |
| 2011/0098857 | A1 | | 4/2011 | Yoshiike et al. |
| 2011/0098860 | A1 | | 4/2011 | Yoshiike et al. |
| 2011/0172825 | A1 | | 7/2011 | Lee et al. |
| 2011/0178637 | A1 | | 7/2011 | Lee et al. |
| 2011/0224827 | A1 | | 9/2011 | Andoh |
| 2011/0231050 | A1 | | 9/2011 | Goulding |
| 2011/0257764 | A1 | | 10/2011 | Herr et al. |
| 2011/0264264 | A1 | | 10/2011 | Shirokura et al. |
| 2011/0301756 | A1 | | 12/2011 | Yoshiike et al. |
| 2012/0072026 | A1 | | 3/2012 | Takagi |
| 2012/0158175 | A1 | | 6/2012 | Lee et al. |
| 2012/0203359 | A1 | | 8/2012 | Schimmels et al. |
| 2012/0245734 | A1 | | 9/2012 | Yun et al. |
| 2012/0259463 | A1 | | 10/2012 | Orita |
| 2012/0277907 | A1 | | 11/2012 | Kim et al. |
| 2012/0310412 | A1 | | 12/2012 | Seo et al. |
| 2012/0316682 | A1 | | 12/2012 | Seo et al. |
| 2012/0316683 | A1 | | 12/2012 | Seo et al. |

(56) References Cited

U.S. PATENT DOCUMENTS

| | | | |
|---|---|---|---|
| 2012/0316684 A1 | 12/2012 | Lee et al. | |
| 2013/0079929 A1 | 3/2013 | Lim et al. | |
| 2013/0144439 A1 | 6/2013 | Lee et al. | |
| 2013/0158712 A1* | 6/2013 | Lee | G05B 19/04 700/261 |
| 2013/0178983 A1 | 7/2013 | Watabe | |
| 2013/0184861 A1 | 7/2013 | Pratt et al. | |
| 2013/0206488 A1 | 8/2013 | Horinouchi | |
| 2013/0238122 A1 | 9/2013 | Hodgins et al. | |
| 2013/0238183 A1* | 9/2013 | Goulding | B62D 57/024 701/26 |
| 2014/0019082 A1 | 1/2014 | Lan et al. | |
| 2014/0100697 A1 | 4/2014 | Goulding | |
| 2015/0051734 A1 | 2/2015 | Zheng et al. | |
| 2015/0073592 A1 | 3/2015 | Kaneko et al. | |
| 2015/0120044 A1 | 4/2015 | Cory | |
| 2015/0134080 A1 | 5/2015 | Roh | |
| 2015/0202768 A1 | 7/2015 | Moridaira | |

OTHER PUBLICATIONS

Bajracharya, et al., "High fidelity day/night stereo mapping with vegetation and negative obstacle detection for vision-in-the-loop walking," 2013 IEEE/RSJ International Conference on Intelligent Robots and Systems (IROS), Nov. 2013, pp. 3663-3670, IEEE, Tokyo, Japan.

Doshi et al., "Collision Detection in Legged Locomotion using Supervised Learning," 2007, 6 pages, MIT Cambridge, US.

Hashlamon et al., "Simple Virtual Slip Force Sensor for Walking Biped Robots," IEEE, 2013, pp. 1-5.

Kim et al., "Landing Force Controller for a Humanoid Robot: Time-Domain Passivity Approach," 2006 IEEE Conference on Systems, Man, and Cybernetics, Oct. 8-11, 2006, Taipei, Taiwan, pp. 4237-4242.

Koolen et al., "Capturability-Based Analysis and Control of Legged Locomotion, Part 1: Theory and Application to Three Simple Gait Models," The International Journal of Robotics Research, 2012, pp. 1094-1113, vol. 31, No. 9.

Pratt et al., "Capture Point: A Step Toward Humanoid Push Recovery," IEEE Humanoid Robots, 2006 6th IEEE-RAS International Conference, Symposium, Dec. 2-6, 2006, pp. 1-8, Genoa, Italy.

Pratt et al., "Capturability-Based Analysis and Control of Legged Locomotion, Part 2: Application to M2V2, a Lower Body Humanoid," The International Journal of Robotics Research, Apr. 2011, pp. 1-25.

Silva et al., "Goal-Oriented Biped Walking Based on Force Interaction Control," Proceedings of the 2001 IEEE International Conference on Robotics & Automation, Seoul, Korea, May 21-26, 2001, pp. 4122-3127.

Silva et al., "Towards Force Interaction Control of Biped Walking Robots," Proceedings of 2004 IEEE/RSJ International Conference on Intelligent Robots and Systems, Sendai, Japan, Sep. 28-Oct. 2, 2004, pp. 2568-2573.

Non-Final Office Action dated Apr. 29, 2016, issued in connection with U.S. Appl. No. 14/709,830, filed May 12, 2015, 39 pages.

Non-Final Office Action dated Apr. 15, 2016, issued in connection with U.S. Appl. No. 14/585,542, filed Dec. 30, 2014, 12 pages.

Non-Final Office Action dated Jun. 3, 2016, issued in connection with U.S. Appl. No. 14/538,777, filed Nov. 11, 2014, 16 pages.

Non-Final Office Action dated Aug. 19, 2015, issued in connection with U.S. Appl. No. 14/468,118, filed Aug. 25, 2014, 14 pages.

Notice of Allowance dated Mar. 14, 2016, issued in connection with U.S. Appl. No. 14/468,118, filed Aug. 25, 2014, 10 pages.

Non-Final Office Action dated Sep. 2, 2015, issued in connection with U.S. Appl. No. 14/468,031, filed Aug. 25, 2014, 31 pages.

Non-Final Office Action dated Mar. 23, 2016, issued in connection with U.S. Appl. No. 14/468,146, filed Aug. 25, 2014, 31 pages.

Notice of Allowance dated Mar. 2, 2016, issued in connection with U.S. Appl. No. 14/468,031, filed Aug. 25, 2014, 7 pages.

Notice of Allowance dated Jun. 24, 2016, issued in connection with U.S. Appl. No. 14/538,777, filed Nov. 11, 2014, 20 pages.

Notice of Allowance dated Jul. 21, 2016, issued in connection with U.S. Appl. No. 14/585,542, filed Dec. 30, 2014, 5 pages.

\* cited by examiner

GENERALIZED COORDINATE SURROGATES FOR INTEGRATED ESTIMATION AND CONTROL

CROSS-REFERENCE TO RELATED APPLICATIONS

This application claims priority to U.S. Provisional Patent Application Ser. No. 62/041,275 filed Aug. 25, 2015, the contents of which are incorporated herein by reference in their entirety.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

The present application discloses implementations that relate to controlling a position of a leg of a robotic device to balance the robotic device. A robotic device may include a control device that employs a control procedure referred to as "touch-down lift-off" (TDLO). The TDLO control procedure may involve determining a location at which to place a particular leg of the robotic device based on measurements associated with another leg. The control device may move the particular leg of the robotic device to the determined location in order to maintain balance and/or the velocity of the robotic device.

An example implementation may include receiving, by a machine, a first measurement indicative of a first distance between a center of mass of the machine and a first position in which a first leg of the machine last made initial contact with a surface. The implementation may also include receiving, by the machine, a second measurement indicative of a second distance between the center of mass of the machine and a second position in which the first leg of the machine was last raised from the surface. The implementation may further include determining a third position in which to place a second leg of the machine based on the received first measurement and the received second measurement. Additionally, the implementation may include providing instructions to move the second leg of the machine to the determined third position.

In another example, the present application describes a non-transitory computer-readable medium having stored thereon instructions that, upon execution by at least one processor, performs a set of operations. The operations may include receiving, by a machine, a first value indicative of a first distance between a center of mass of the machine and a first position in which a first leg of the machine last made contact with a surface. The operations may also include receiving, by the machine, a second value indicative of a second distance between the center of mass of the machine and a second position in which the first leg of the machine was last raised from the surface. The operations may further include determining a third position in which to place a second leg of the machine based on the received first value and the received second value. Additionally, the operations may include providing instructions to move the second leg of the machine to the determined third position.

In yet another example, the present application describes a machine that includes at least two legs, a sensor, and a control device configured to perform a set of operations. The at least two legs includes a first leg and a second leg. The operations may include receiving, from the sensor, a first measurement indicative of a first distance between a center of mass of a machine and a first position in which the first leg of the machine last made contact with a surface. The operations may also include receiving, from the sensor, a second measurement indicative of a second distance between the center of mass of the machine and a second position in which the first leg of the machine was last raised from the surface. The operations may further include determining a third position in which to place the second leg of machine based on the received first measurement and the received second measurement. Additionally, the operations may include providing instructions to move the second leg of the machine to the determined third position.

In one aspect, the present application describes a system. The system may include a means for receiving, by a machine, a first measurement indicative of a first distance between a center of mass of the machine and a first position in which a first leg of the machine last made contact with a surface. The system may also include a means for receiving, by the machine, a second measurement indicative of a second distance between the center of mass of the machine and a second position in which the first leg of the machine was last raised from the surface. The system may further include a means for determining a third position in which to place a second leg of the machine based on the received first measurement and the received second measurement. Additionally, the system may include a means for providing instructions to move the second leg of the machine to the determined third position.

These as well as other aspects, advantages, and alternatives, will become apparent to those of ordinary skill in the art by reading the following detailed description, with reference where appropriate to the accompanying figures.

DETAILED DESCRIPTION

Figure 1:
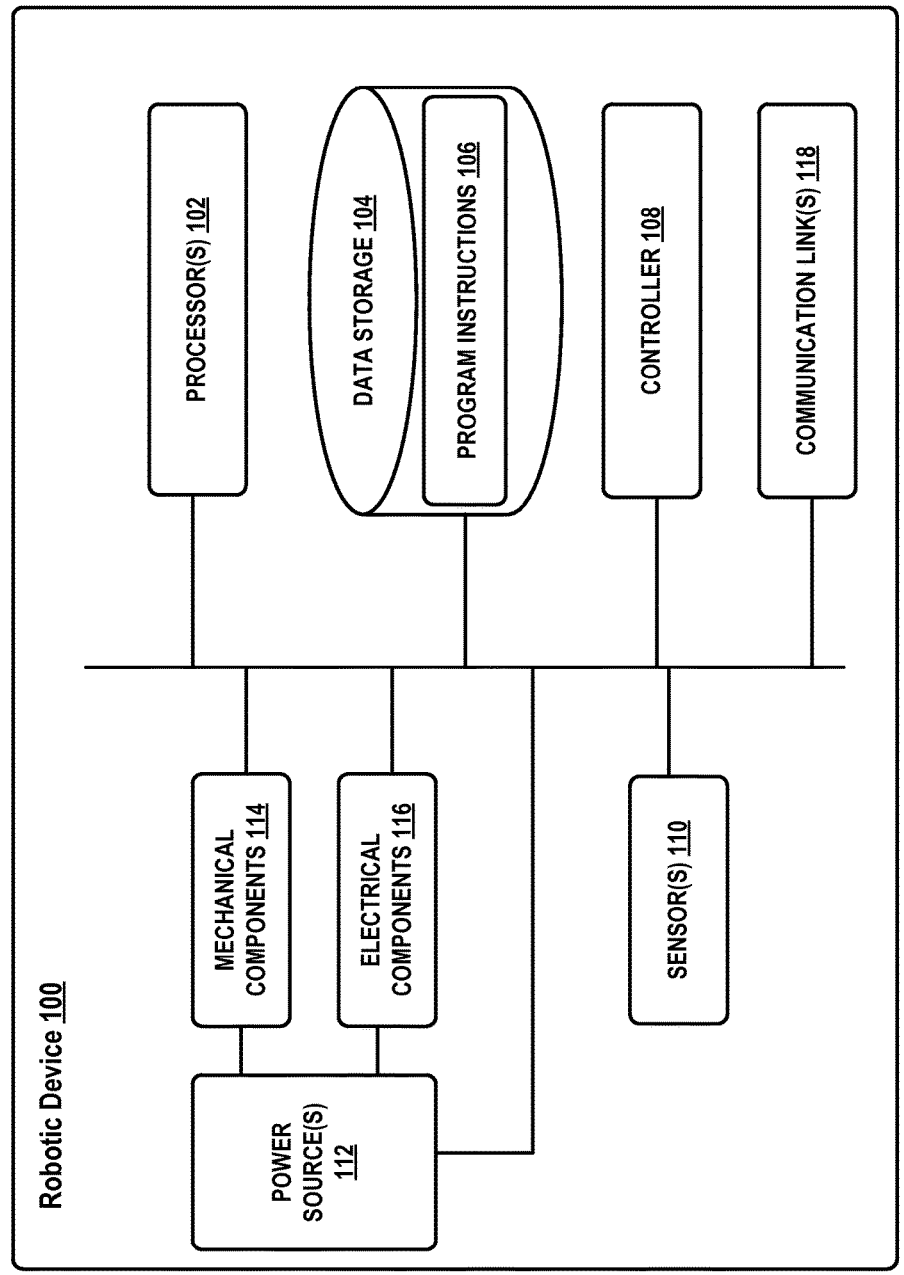
FIG. 1 illustrates a configuration of a robotic system, according to an example implementation.

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

An example implementation involves a robotic device configured with at least two robotic legs, sensors, and a control device. The control device may implement a control system that instructs the movement of the robotic legs to balance the robotic device. The control device may receive measurements or data from the sensors indicative of the position, velocity, acceleration, and/or orientation of each robotic leg at a given time. Each robotic leg may have any number of actuators (e.g., 2-5 actuators) that can be controlled to move the robotic leg through its range of motion.

The control device may implement a control procedure that is referred to herein as "touch-down lift-off" (TDLO). TDLO involves determining a position in which a stance leg of a robotic device first made initial contact with the ground (touch-down) and a position in which the same leg was raised from the ground (lift-off). The position measurements are relative to the center of mass (CoM) of the robot. For example, when a robot's body is moving above a stationary planted leg, the touch-down and lift-off measurements differ although the leg is not being dragged, lifted, or otherwise moved from its planted position. TDLO also involves determining a position at which to place a swing leg of the robotic device in order to maintain balance. A control device implementing TDLO may control actuators on the swing leg to move it to the determined position. In some implementations, the control device may provide instructions to a computing device that controls the movement of the robotic leg.

During operation, at a given time, a legged robotic device may have one or more "stance" legs and one or more "swing" legs. For example, a walking bipedal robot generally has one leg planted on the ground (the stance leg) as the other leg (the swing leg) is lifted from its previous planted position and moved to the next planted position on the ground. In a typical walking gait for a bipedal robot, each leg alternates between being a stance leg and being a swing leg.

As the bipedal robot walks forward, a stance leg is first planted in front of the robot. Then, the robot's body moves over the planted stance leg until the stance leg is behind the robot's body. As this occurs, the other leg (the swing leg) swings forward and is planted in front of the robot's body. Collectively, the period of time where one leg is a stance leg and the other is a swing leg is referred to herein as a "stance period" (consecutive stance periods denoted herein as k, (k+1), etc.). When the swing leg is planted in front of the robot, it becomes the stance leg for the next stance period, and the previous stance leg is lifted from its planted position and begins swinging forward to become the swing leg for the following stance period. In other words, if the left leg was the stance leg and the right leg was the swing leg in stance period k, the left leg will be the swing leg and the right leg may be the stance leg in stance period (k+1).

TDLO considers two measurements for a stance leg—the touch-down measurement (the position of the stance leg relative to the robot's CoM at the moment the stance leg makes initial contact with the ground) and the lift-off measurement (the position of the stance leg relative to the robot's CoM at the moment the stance leg lifts off the ground). Based on these two measurements for the stance leg, the TDLO control law determines a position at which to place the swing leg (which, once placed on the ground, becomes the next stance leg). Then, TDLO involves measuring the touch-down and lift-off positions for the new stance leg to determine the position at which to place the new swing leg.

In some implementations, a robotic leg may alternatively or additionally modify the magnitude and location of forces being applied to the ground by the robotic device to maintain balance. In some cases, moving the leg may not be necessary to maintain balance, and the control system may alternatively apply a greater or lesser extent of force to the ground to maintain balance.

In some implementations, the TDLO control procedure may include a forcing function that modifies the behavior of a control device implementing the TDLO control procedure. A robotic device may include any number of robotic legs that are naturally offset from the CoM of the robotic device (i.e., not directly beneath the CoM of the robotic device). These offsets may specify a forcing function, thereby preventing the control device from providing extraneous correction to balance the robotic device. In some instances, the forcing function may alter a robot's stepping pattern to achieve a more natural movement of the robotic legs.

In some cases, the forcing function may bias the direction in which the robotic device is travelling. For instance, a certain trajectory may be desired, and the forcing function may be used to guide the robotic device along that trajectory. As one possible example, a robotic device may be instructed to move in a particular direction with a specified speed, and the forcing function may account for this desired speed and direction in order to move the robot this way while maintaining balance.

The control system may be configured to actuate one or more actuators connected across components of a robotic leg. The actuators may be controlled to raise or lower the robotic leg. In some cases, a robotic leg may include actuators to control the robotic leg's motion in three dimensions.

Referring now to the figures, FIG. 1 illustrates an example configuration of a robotic device, according to an example implementation. The robotic system 100 represents an example robotic device configured to perform the operations described herein. Additionally, the robotic device 100 may be configured to operate autonomously, semi-autonomously, and/or using directions provided by user(s), and may exist in various forms, such as a humanoid robot or a quadruped robot, among other examples. Furthermore, the robotic device 100 may also be referred to as a robotic device, mobile robot, or robot, among other designations.

As shown in FIG. 1, the robotic device 100 includes processor(s) 102, data storage 104, program instructions 106, controller 108, sensor(s) 110, power source(s) 112, mechanical components 114, electrical components 116, and electrical components 118. Note that the robotic device 100 is shown for illustration purposes, as robotic device 100 and may include more or less components within examples. The various components of robotic device 100 may be connected in any manner, including wired or wireless connections, etc. Further, in some examples, components of the robotic device 100 may be positioned on multiple distinct physical entities rather on a single physical entity. Other example illustrations of robotic device 100 may exist as well.

Processor(s) 102 may operate as one or more general-purpose processors or special purpose processors (e.g., digital signal processors, application specific integrated circuits, etc.). The processor(s) 102 can be configured to execute computer-readable program instructions 106 that are stored in the data storage 104 and are executable to provide the operations of the robotic device 100 described herein. For instance, the program instructions 106 may be executable to provide operations of controller 108, where the controller 108 may be configured to cause activation and deactivation of the mechanical components 114 and the electrical components 116. The processor(s) 102 may operate and enable the robotic device 100 to perform various functions, including the functions described herein.

The data storage 104 may exist as various types of storage configured to hold memory. For example, the data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some embodiments, the data storage 104 can be implemented using a single physical device (e.g., one optical, magnetic, organic or other memory or disc storage unit), while in other embodiments, the data storage 104 can be implemented using two or more physical devices, which may communicate via wired or wireless communication. Further, in addition to the computer-readable program instructions 106, the data storage 104 may include additional data such as diagnostic data, among other possibilities.

The robotic device 100 includes at least one controller 108, which may interface with the robotic device 100. The controller 108 may serve as a link between portions of the robotic device 100, such as a link between mechanical components 114 and/or electrical components 116. In some instances, the controller 108 may serve as an interface between the robotic device 100 and another computing device. Further, the controller 108 may serve as an interface between the robotic system 100 and a user(s). The controller 108 may include various components for communicating with the robotic device 100, including a joystick(s), buttons, among others. The controller 108 may perform other functions for the robotic device 100 as well. Other examples of controllers may exist as well.

Additionally, the robotic device 100 includes one or more sensor(s) 110 such as force sensors, proximity sensors, motion sensors, load sensors, position sensors, touch sensors, depth sensors, ultrasonic range sensors, and infrared sensors, among other possibilities. The sensor(s) 110 may provide sensor data to the processor(s) 102 to allow for appropriate interaction of the robotic system 100 with the environment as well as monitoring of operation of the systems of the robotic device 100. The sensor data may be used in evaluation of various factors for activation and deactivation of mechanical components 114 and electrical components 116 by controller 108 and/or a computing system of the robotic device 100.

The sensor(s) 110 may provide information indicative of the environment of the robotic device for the controller 108 and/or computing system to use to determine operations for the robotic device 100. For example, the sensor(s) 110 may capture data corresponding to the terrain of the environment or location of nearby objects, which may assist with environment recognition and navigation, etc. In one example configuration, the robotic device 100 may include a sensor system that may include a camera, RADAR, LIDAR, a global positioning system (GPS) transceiver, and/or other sensors for capturing information of the environment of the robotic device 100. The sensor(s) 110 may monitor the environment in real-time and detect obstacles, elements of the terrain, weather conditions, temperature, and/or other parameters of the environment for the robotic device 100.

Further, the robotic device 100 may include other sensor(s) 110 configured to receive information indicative of the state of the robotic device 100, including sensor(s) 110 that may monitor the state of the various components of the robotic device 100. The sensor(s) 110 may measure activity of systems of the robotic device 100 and receive information based on the operation of the various features of the robotic device 100, such the operation of extendable legs, arms, or other mechanical and/or electrical features of the robotic device 100. The sensor data provided by the sensors may enable the computing system of the robotic device 100 to determine errors in operation as well as monitor overall functioning of components of the robotic device 100. For example, the computing system may use sensor data to determine the stability of the robotic device 100 during operations, as well as measurements related to power levels, communication activities, components that require repair, among other information. As one example configuration, the robotic device 100 may include gyroscope(s), accelerometer(s), and/or other possible sensors to provide sensor data relating to the state of operation of the robotic device. Further, sensor(s) 110 may also monitor the current state of a function, such as a gait, that the robotic system 100 may currently be operating. Additionally, the sensor(s) 110 may measure a distance between a given robotic leg of a robotic device and a center of mass of the robotic device. Other example uses for the sensor(s) 110 may exist as well.

Additionally, the robotic device 100 may also include one or more power source(s) 112 configured to supply power to various components of the robotic device 100. Among possible power systems, the robotic device 100 may include a hydraulic system, electrical system, batteries, and/or other types of power systems. As an example illustration, the robotic device 100 may include one or more batteries configured to provide power to components that may be charged via a wired and/or wireless connection. Within examples, components of the mechanical components 114 and electrical components 116 may each connect to a different power source or may be powered by the same power source. Components of the robotic system 100 may connect to multiple power sources as well.

Within example configurations, any type of power source may be used to power the robotic device 100, such as a gasoline engine. Further, the power source(s) 112 may charge using various types of charging, such as wired connections to an outside power source, wireless charging, combustion, or other examples. Other configurations may also be possible. Additionally, the robotic device 100 may include a hydraulic system configured to provide power to the mechanical components 114 using fluid power. Components of the robotic device 100 may operate based on hydraulic fluid being transmitted throughout the hydraulic system to various hydraulic motors and hydraulic cylinders, for example. The hydraulic system of the robotic device 100 may transfer a large amount of power through small tubes, flexible hoses, or other links between components of the robotic device 100. Other power sources may be included within the robotic device 100.

Mechanical components 114 represent hardware of the robotic system 100 that may enable the robotic device 100 to operate and perform physical operations. As a few examples, the robotic device 100 may include actuator(s), extendable leg(s) ("legs"), arm(s), wheel(s), one or multiple structured bodies for housing the computing system or other components, and/or other mechanical components. The mechanical components 114 may depend on the design of the robotic device 100 and may also be based on the operations and/or tasks the robotic device 100 may be configured to perform. As such, depending on the operations and/or tasks of the robotic device 100, different mechanical components 114 may be available for the robotic device 100 to utilize. In some examples, the robotic device 100 may be configured to add and/or remove mechanical components 114, which may involve assistance from a user and/or other robotic device. For example, the robotic device 100 may be initially configured with four legs, but may altered by a user or the robotic device 100 to remove two of the four legs to operate as a biped. Other examples of mechanical components 114 may be included within some examples.

The electrical components 116 may include various components capable of processing, transferring, providing electrical charge or electric signals, for example. Among possible examples, the electrical components 116 may include electrical wires, circuitry, and/or wireless communication transmitters and receivers to enable operations of the robotic device 100. The electrical components 116 may interwork with the mechanical components 114 to enable the robotic device 100 to perform various operations. The electrical components 116 may be configured to provide power from the power source(s) 112 to the various mechanical components 114, for example. Further, the robotic device 100 may include electric motors. Other examples of electrical components 116 may exist as well.

In some implementations, the robotic device 100 may also include communication link(s) 118 configured to send and/or receive information. The communication link(s) 118 may transmit data indicating the state of the various components of the robotic device 100. For example, information read in by sensor(s) 110 may be transmitted via the communication link(s) 118 to a separate device. Other diagnostic information indicating the integrity or health of the power source(s) 112, mechanical components 114, electrical components 116, processor(s) 102, data storage 104, and/or controller 108 may be transmitted via the communication link(s) 118 to an external communication device. Other information may be transmitted over the communication link(s) 118 as well.

In some implementations, the robotic device 100 may receive information at the communication link(s) 118 that is processed by the processor(s) 102. The received information may indicate data that is accessible by the processor(s) 102 during execution of the program instructions 106, for example. Further, the received information may change aspects of the controller 108 that may affect the behavior of the mechanical components 114 or the electrical components 116. In some cases, the received information indicates a query requesting a particular piece of information (e.g., the operational state of one or more of the components of the robotic device 100), and the processor(s) 102 may subsequently transmit that particular piece of information back out the communication link(s) 118.

In some cases, the communication link(s) 118 include a wired connection. The robotic device 100 may include one or more ports to interface the communication link(s) 118 to an external device. The communication link(s) 118 may include, in addition to or alternatively to the wired connection, a wireless connection. Some example wireless connections may utilize a cellular connection, such as CDMA, EVDO, GSM/GPRS, or 4G telecommunication, such as WiMAX or LTE. Alternatively or in addition, the wireless connection may utilize a Wi-Fi connection to transmit data to a wireless local area network (WLAN). In some implementations, the wireless connection may also communicate over an infrared link, Bluetooth, or a near-field communication (NFC) device.

Figure 2:
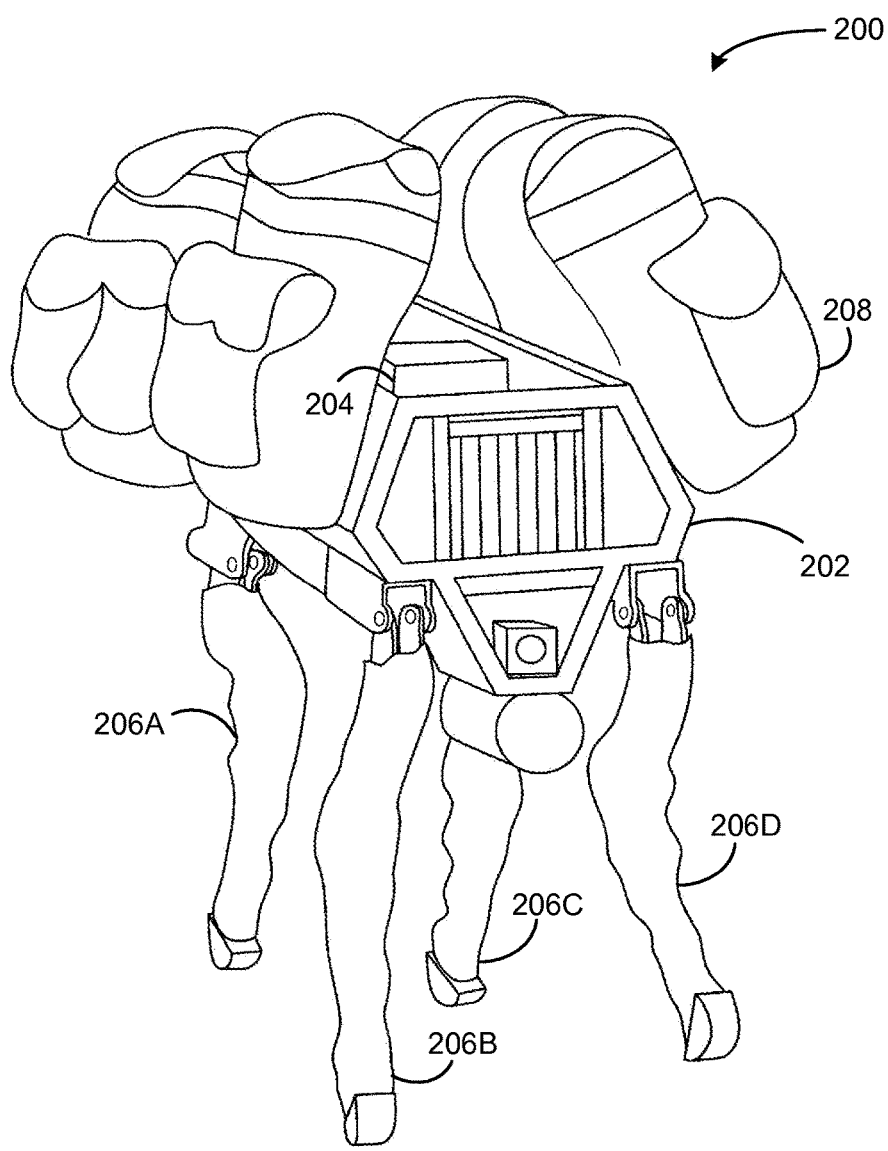
FIG. 2 illustrates a perspective view a quadruped robot, according to an example implementation.

FIG. 2 illustrates a perspective view of an example quadruped robot, according to an example embodiment. Among other possible functions, the robotic device 200 may be configured to perform the procedures described herein during operation. The robotic device 200 includes legs 206A, 206B, 206C, and 206D connected to a body 202 of the robotic device 200 and may also include sensors configured to provide sensor data to a computing system of the robotic device 200. Sensors may be incorporated within portions of the legs 206A, 206B, 206C, and 206D to detect pressure, position, velocity, acceleration, and orientation, among other measurements. Sensors may be in other locations as well. Further, the robotic device 200 is illustrated carrying objects 208 on the body 202. Within other example implementations, the robotic device 200 may include more or fewer components and may additionally include components not shown in FIG. 2.

The robotic device 200 may be a physical representation of the robotic system 100 shown in FIG. 1 or may be based on other configurations. To operate, the robotic device 200 includes a computing system that be made up of one or multiple computing devices configured to assist in various operations of the robotic device 200. These operations may include processing data and providing outputs based on the data to cause various changes to the physical state of the robotic device 200. The computing system may process information provided by various systems of the robotic device 200 (e.g., a sensor system) or from other sources (e.g., a user, another robotic device, a server) and may provide instructions to these systems to operate in response.

Additionally, the computing system may monitor systems of the robotic device 200 during operation, which may include monitoring for errors and/or monitoring regular operation, for example. In some example configurations, the computing system may serve as a connection between the various systems of the robotic device 200, and may coordinate the operations of the systems together to enable the robotic device 200 to perform tasks. Further, the computing system may include multiple devices, processors, controllers, and/or other entities configured to control or assist in the operation of the robotic device. Additionally, the computing system may operate using various types of memory and/or other components.

The robotic device 200 exists as a quadruped robotic device with four extendable legs 206A, 206B, 206C, and 206D. Although the robotic device 200 includes four legs 206A, 206B, 206C, and 206D in the illustration shown in FIG. 2, the robotic device 200 may include more or less legs within other examples. Further, the configuration, position, and/or structure of the legs 206A, 206B, 206C, and 206D may vary in example implementations. The legs 206A, 206B, 206C, and 206D enable the robotic device 200 to move and may be configured to operate in multiple degrees of freedom to enable different techniques of travel to be performed. In particular, the legs 206A, 206B, 206C, and 206D may enable the robotic device 200 to travel at various speeds by way of mechanical control.

A gait is a pattern of movement of the limbs of animal, robotic device, or other mechanical structure. As such, the robotic device 200 may navigate by operating the legs 206A, 206B, 206C, and 206D to perform various gaits. The robotic device 200 may use a variety gaits to travel within an environment, which may involve selecting a gait based on speed, terrain, the need to maneuver, and/or energy efficiency. The robotic device 200 may be configured to dynamically switch between gaits, which may enable the robotic device to change speeds or the mechanics of operating the legs 206A, 206B, 206C, and 206D.

Further, different types of robotic devices may use different gaits due to differences in design that may enable or prevent use of certain gaits. Although some gaits may have specific names (e.g., walk, trot, run, gallop, and bound), the distinctions between these gaits may be slight. The gaits may be classified based on footfall patterns, the patterns including locations on a surface for the placement of distal ends of the extendable legs (e.g., feet). Similarly, gaits may also be classified based on mechanics.

Additionally, the robotic device 200 may include other mechanical apertures or appendages, which may be attached to the robotic device 200 at various positions. The robotic device 200 may include mechanical arms, grippers, wheels, or other features. The legs 206A, 206B, 206C, and 206D may have feet or other types of mechanical features (e.g., rubber feet to increase friction between the robotic device and a surface) that enables control upon various types of surfaces that the robotic device may encounter.

As part of the design of the example robotic device 200, the body 202 of the robotic device 200 connects to the legs 206A, 206B, 206C, and 206D and may house various components of the robotic device 200. As such, the structure of the body 202 may vary within examples and may further depend on particular operations that a given robotic device may have been designed to perform. For example, a robotic device developed to carry heavy loads may have a wide body that enables placement of the loads. Similarly, a robotic device designed to reach high speeds may have a narrow, small body that does not have substantial weight. Further, the body 202 as well as the legs 206A, 206B, 206C, and 206D may be developed using various types of materials, such as various metals or plastics. Within other examples, a robotic device may have a body with a different structure or made of other types of materials.

The sensor(s) 204 of the robotic device 200 may include various types of sensors, such as a camera or a sensing system. The sensor(s) 204 may be placed at various positions on the robotic device. As described for the robotic system 100, the robotic device 200 may include a sensory system that includes a camera, RADAR, LIDAR, a GPS transceiver, accelerometer(s), gyroscope(s), and/or other types of sensors. The sensor(s) may be configured to measure parameters of the environment of the robotic device 200 as well as monitor internal operations of systems of the robotic device 200. In some examples, the robotic device 200 may include sensors to measure the orientation, position, velocity, or acceleration of each leg 206A, 206B, 206C, and 206D.

The loads 208 carried by the robotic device 200 may represent various types of cargo that the robotic device 200 may transport. The loads 208 may also represent external batteries or other types of power sources (e.g., solar panels) that the robotic device 200 may utilize. The loads 208 represent one example use the robotic device 200 may be configured for. As such, the robotic device 200 may be configured to perform other operations as well.

Additionally, as shown with the robotic system 100, the robotic device 200 may also include various electrical components that may enable operation and communication between the mechanical features of the robotic device 200. As previously indicated, the robotic device 200 may include one or more computing systems that include one or multiple processors configured to perform various functions, including processing inputs to provide outputs. The computing system may include additional components, such as various types of storage and a power source, etc.

Control system 202 of robotic device 200 may cause the robotic device 200 to navigate an environment based on sensor data from the sensing system. The sensing system may include sensors of sensing system coupled to portions of the robotic device 200. The robotic device 200 may receive navigation commands by way of a communication system. For instance, the robotic device may receive a command to move forward at 5 kilometers per hour. The command may specify to walk forward for a particular distance, such as 100 meters. In one example, a command may specify one or more locations at which to place particular legs.

In some examples, the navigation commands may involve GPS coordinates. In one instance, a command may instruct the robotic device to navigate to a particular position, which may be defined by particular GPS coordinates. The robotic device may then cause the locomotion system to move to the position while navigating physical features of the terrain identified by the control system (perhaps based on data from perception sensors). Another command may instruct the robotic device to follow a particular person, who may have with them a GPS enabled device that generates data indicating the position of the person. The data may be communicated to the robotic device that may then cause the locomotion system to follow the person while navigating physical features of the terrain identified by the control system.

In some example embodiments, during operation, the computing system may communicate with other systems of the robotic device 200 via wired or wireless connections and may further be configured to communicate with one or multiple users of the robotic device. As one possible illustration, the computing system may receive an input from a user indicating that the user wants the robotic device to perform a particular gait in a given direction. The computing system may process the input, and may cause the systems of the robotic device to perform the requested gait. Additionally, the robotic device's electrical components may include other type of electrical components, including but not limited to interface, wires, busses, and/or other communication links configured to enable systems of the robotic device to communicate.

Furthermore, the robotic device 200 may communicate with one or more users and/or other robotic devices via various types of interfaces. In an example embodiment, the robotic device 200 may receive input from a user via a joystick or similar type of interface. The computing system may be configured to receive data indicative of the amount of force and other possible information from a joystick interface. Similarly, the robotic device 200 may receive inputs and communicate with a user via other types of interface, such as a mobile device or a microphone. Regardless, the computing system of the robotic device 200 may be configured to process the various types of inputs that the robotic device 200 may receive.

Figure 3:
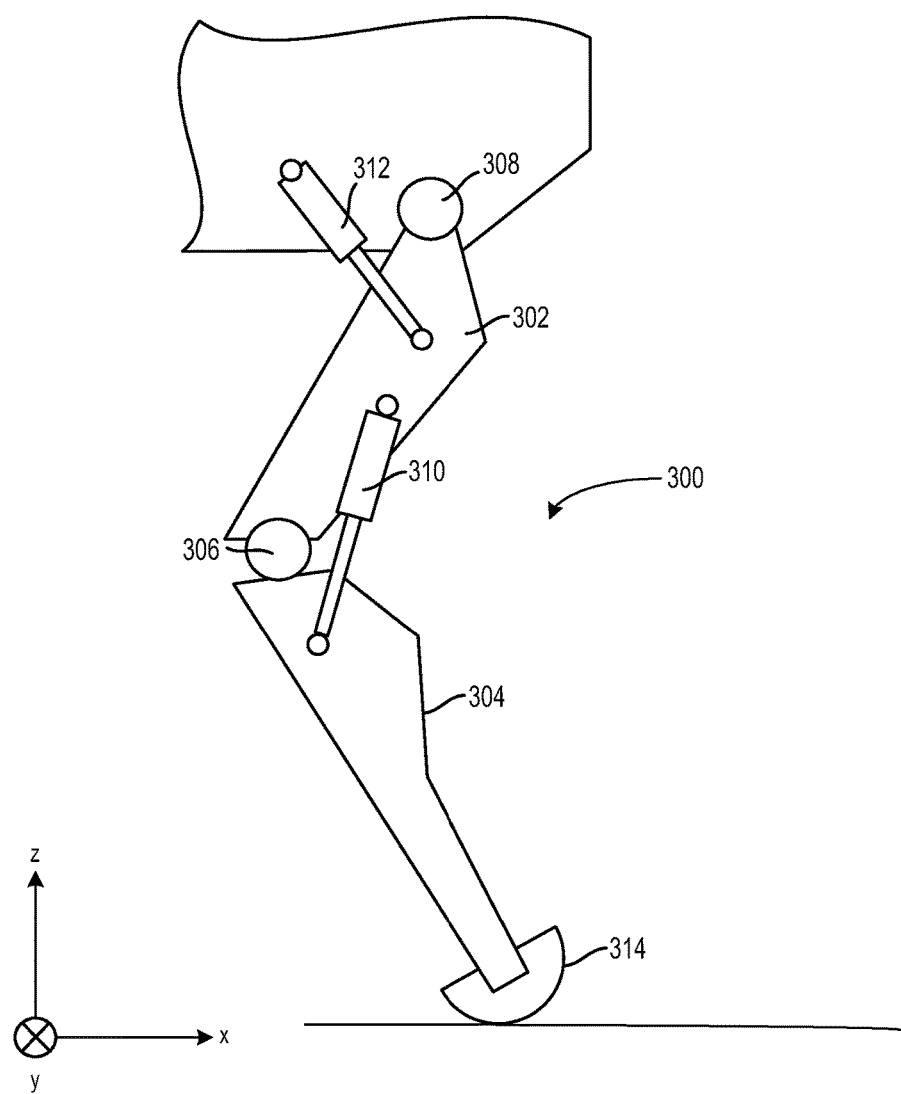
FIG. 3 illustrates a side view of a robotic leg, according to an example implementation.

FIG. 3 is a side-view of an example articulable robotic leg 300. The robotic leg 300 includes a member 302 having an inboard end that is connected to the robotic device at joint 308. The member 302 has an outboard end that is connected in a rotatable manner to an inboard end of a member 304 at joint 306. The member 304 has an outboard end that is connected to a foot member 314. The robotic leg 300 also includes an actuator 312 connected between the member 302 and the robotic device. In some implementations, the actuator 312 may be a linear hydraulic actuator. Actuation of the actuator 312 causes the member 302 and the member 304 to rotate around joint 308. Similarly, actuation of the actuator 310 causes the member 304 to rotate around the joint 306.

Figure 4A:
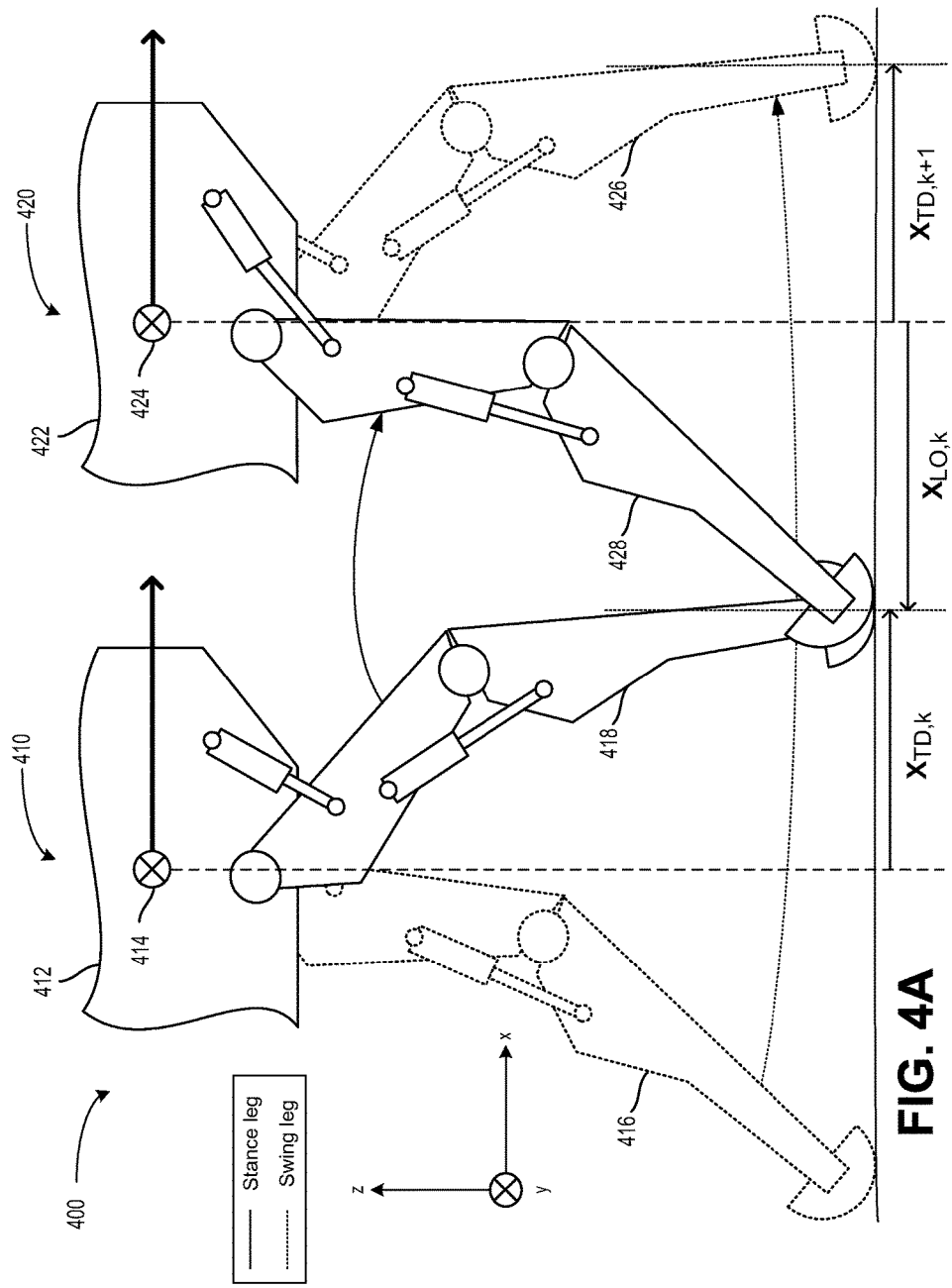
FIG. 4A illustrates a side view of states of robotic legs of a robotic device, according to an example implementation.
Figure 4B:
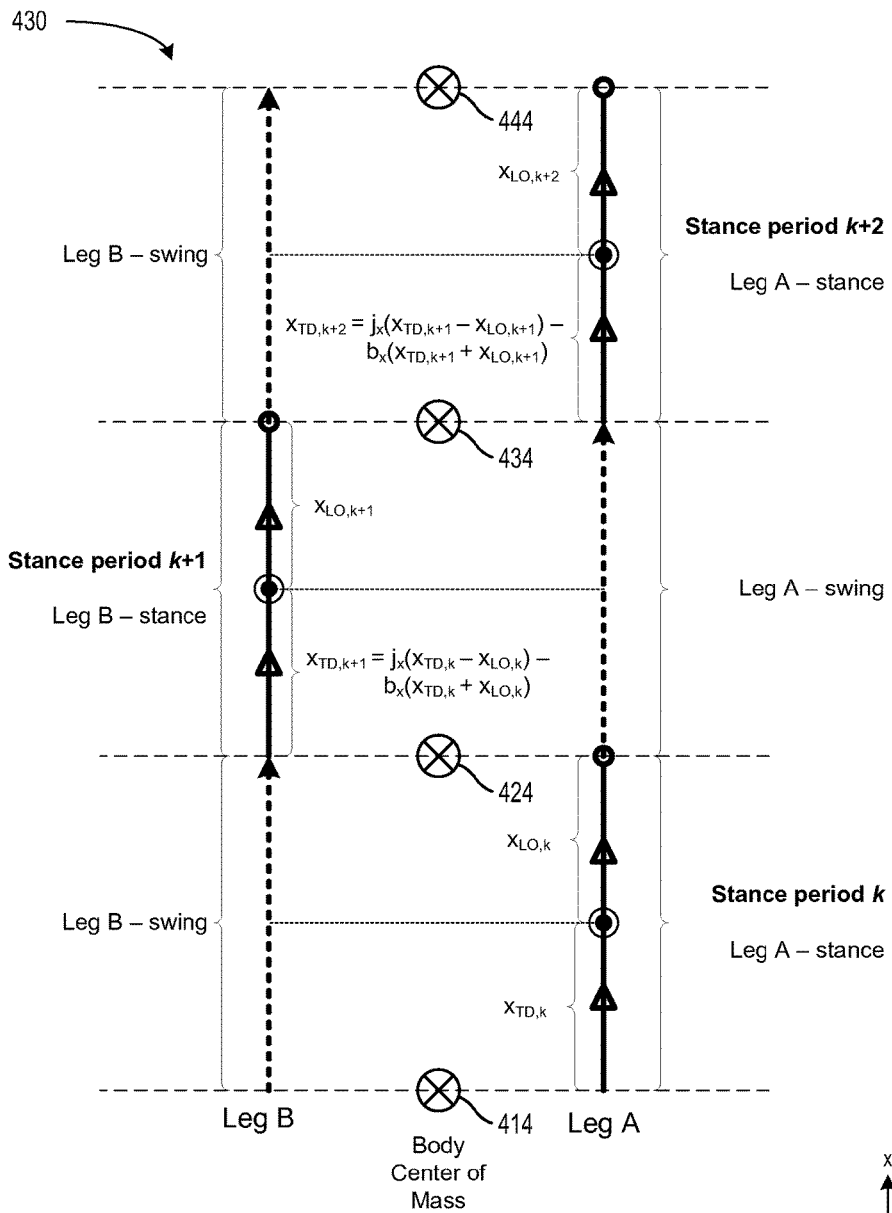
FIG. 4B illustrates a schematic top-down view of states of robotic legs of a robotic device, according to an example implementation.

Actuating the actuator 310 and the actuator 312 in combination may cause the leg to take a step. For instance, the actuator 310 may retract, which causes member 304 to rotate counter-clockwise (from the perspective shown in FIG. 3) around joint 306. This rotation may raise the leg 300 up from the ground. The actuator 312 may retract, which causes member 302 to rotate clockwise (from the perspective shown in FIG. 3) around joint 308. By rotating member 302 clockwise around joint 308, foot member 314 moves forward relative to the ground. Actuators 310 and 312 may then extend and thereby cause robotic leg 300 to lower and push against the ground, thereby causing the robotic device to move forward or to adopt a new stance. Example states of the robotic leg 300 are depicted in FIG. 4A and FIG. 4B.

The robotic device may move according to different gaits by varying the timing of actuation, speed of actuation, and range of actuation of the actuators. The particular gaits that a particular robotic device is capable of performing may depend upon the range of motion of its legs and the force and velocity specifications of the actuators. The range of motion of its legs may in turn depend upon the leg length and range of travel of the actuators. In some implementations, the robotic device includes hydraulic actuators, which may provide linear actuation by way of pressurized fluid within a chamber and a piston. Acceleration of such actuators is proportional to the pressure of the hydraulic fluid used to actuate the hydraulic actuator—with a given load, higher pressure results in greater acceleration. The control system may select a particular gait based on factors such as speed, terrain, the need to maneuver, and/or energy efficiency. For instance, the robotic device may transition from a walk to a run as speed of locomotion is increased. The robotic device may then transition back to a walk on uneven terrain. The robotic device may include any combination of hydraulic actuators, pneumatic actuators, electric motors, thermal actuators, magnetic actuators, and/or other mechanical actuators.

Load on the hydraulic actuators may vary during the stepping sequence. During the portion of the gait in which the hydraulic actuators are causing a leg to push against the ground, the load on the hydraulic actuators is relatively large compared to the portion of the gait in which the hydraulic actuators are raising the leg and stepping forward. As the load varies, the robotic device may vary the hydraulic pressure to maintain the movement of the legs according to the gait.

Although the side view of the robotic leg in FIG. 3 is shown with two actuators 310 and 312 that move the robotic leg in two dimensions, the robotic leg may have any number of actuators that allow for more or fewer degrees of freedom. In some cases, the robotic leg may include actuators that allow for lateral movement of the robotic leg (i.e., in the y-direction depicted in FIG. 3) in addition to longitudinal movement (i.e., in the x-direction depicted in FIG. 3) and vertical movement (i.e., in the z-direction depicted in FIG. 3). Further, the robotic leg is depicted as having two members 302 and 304, however any number of members may be included that might be connected at joints and controlled with actuators.

FIG. 4A and FIG. 4B depict example states of robotic legs of a robotic device. The robotic legs shown in FIG. 4A may be the same as or similar to robotic leg 300 depicted in FIG. 3. At a given point in time, the robotic leg may be lifting off a surface (which may be referred to herein as the "lift-off state"), swinging forward, touching down on a surface (which may be referred to herein as the "touch-down state"), or planted on the ground, among other possible states. In operation, the robotic leg may transition between these various states by extending or compressing the actuators of the robotic leg. The moment of lift-off and the moment of touch-down may occur at different points in time. In FIG. 4A, the stance leg during stance period k is illustrated using solid lines, and the swing leg during stance period k is illustrated using dotted lines. A robotic device may have any number of robotic legs that may be moved in a similar way to the robotic leg depicted in FIG. 4A. The robotic device may be in motion or stationary, depending on the particular scenario.

In some implementations, a robotic device may include a control device that receives information from sensors on various portions of the robotic device and controls the actuators of a particular leg in order to move that leg to a particular location. The control device may use sensor information to determine the location at which to place a given robotic leg.

The robotic legs depicted in FIGS. 3 and 4A are shown from a side-view perspective and depict single-dimensional measurements and movement of the robotic device (in the x-direction). However, in some scenarios, a robotic device may have a trajectory that involves lateral turning or traversing sloped surfaces. The robotic leg may move within a three-dimensional space, and the measurements and determinations of the placement of the foot of a robotic leg may be performed for each dimension to provide balance control in a variety of scenarios.

The robotic leg depicted in FIG. 4A may be a simplified representation of a robotic leg, and that, in various implementations, a robotic leg may be differently proportioned or may contain additional components. Additionally, the body of the robotic device is a simplified representation of a body for the purposes of explanation. Further, the surface depicted in FIG. 4A may be referred to as "the ground," although the surface that robotic device stands on may be any other man-made or natural surfaces.

FIG. 4A illustrates two robotic legs of a robotic device 400 at two points in time—first state 410 and second state 420. The robotic device 400 shown in FIG. 4A is moving in a forward x-direction (i.e., to the right in FIG. 4A). At first state 410, the body of the robotic device 400 is in position 412 and has a CoM 414. The first state 410 may represent a particular point in time at which the swing leg is in position 416 and the stance leg is in position 418. At the point in time represented by first state 410, the stance leg in position 418 has made initial contact with the ground, at a distance of $X_{TD,k}$ from the CoM 414 of the robotic device 400. Additionally, the point in time represented by first state 410 is the moment at which the swing leg in position 416 is about to be lifted off the ground and begin moving forward. The first state 410 marks the beginning of stance period k.

After the stance leg in position 418 is placed on the ground and the swing leg in position 416 is raised from the ground, the robotic device's body pivots on the stance leg and moves from position 412 to position 422. The weight of robotic device 400 is placed upon the stance leg as it transitions from the position 418 in the first state 410 to position 428 in the second state 420. The point in time represented by second state 420 is the moment at which the stance leg in position 428 is about to be lifted off the ground and begin moving forward, thereby becoming the next swing leg. The distance $X_{LO,k}$ from the CoM 424 of the robotic 400 represents the lift-off measurement during stance period k. While the stance leg is planted, the swing leg lifts from position 416 and swings forward until it reaches position 426. A control device of the robotic device 400 implementing TDLO control law may use the $x_{TD,k}$ and the $X_{LO,k}$ measurements as a basis for determining the particular position 426, which corresponds to a distance $X_{TD,k+1}$ in front of the CoM 424 of the robotic device 400 at state 420. At the moment in time where the stance leg in position 428 is lifted from the ground and the swing leg in position 426 is planted on the ground, the stance period advances to (k+1).

Note that the gait of the robotic device 400 described above is an ideal walking gait, where exactly one stance leg is touching the ground at any given point in time, and the swing leg is in the air swinging to the next touchdown. At stance transitions, as a swing leg makes initial contact with the ground, the stance leg is lifted from the ground at the same moment in time. However, in some scenarios, a slower walking gait may result both the swing leg and the stance leg touching the ground simultaneously for a short period of time before the swing leg is lifted and begins moving forward. In other scenarios, a faster gait (e.g., running) may result in neither the swing leg nor the stance leg touching the ground at certain points in time during a given stance period. TDLO control law may also be applied to these various gaits; the ideal walking gait description above is provided for explanatory purposes.

In some instances, the location of the foot relative to the ground may change between the first state 410 and the second state 420. For example, the surface may be slick or otherwise provide a low amount of friction, causing the foot to slip and change its location on the ground. Thus, the location at which the foot of the robotic leg is pivoted on the ground relative to the ground may differ between first state 410 and second state 420. In some implementations, sensors (e.g., an IMU on the robotic device's body) may detect these slips and provide corrective measures to the TDLO control law in order to maintain stability.

In some instances, it may be desired to move the robotic device at a constant velocity. In these instances, states 410 and 420 may be separated by a fixed time interval (e.g., 0.1 seconds to 5 seconds). On the other hand, it may be desired to accelerate and/or decelerate the robotic device in order to increase or decrease its velocity. In some cases, the time interval between states may be shortened or lengthened in order to increase or decrease the robotic device's velocity, respectively. In other cases, the time interval between states may be held at the fixed time interval, and the distances between touch-down $x_{TD,k}$ and lift-off $x_{LO,k}$ may be decreased or increased in order to increase or decrease the robotic device's velocity, respectively. In some implementations, both the time interval separating states and the distances $x_{TD,k}$ and $x_{LO,k}$ may be modified in order to accelerate or decelerate the robotic device.

Note that, although the touch-down position $x_{TD,k}$ can be determined at the moment the robotic leg makes initial contact with the ground during stance period k, the final lift-off position $x_{LO,k}$ for stance period k may not be known until the moment the robotic leg lifts off the ground. Thus, the final lift-off measurement $x_{LO,k}$ for the stance leg—which is used to determine the next touch-down location $x_{TD,k+1}$ of the swing leg in stance period k (i.e., the next stance leg in stance period (k+1))—may not be determined until a moment before the swing leg touches down.

In some instances, a control system of the robotic device may periodically measure the lift-off location $x_{LO,k}$ during a given stance period. When the lift-off location $x_{LO,k}$ is updated, a new touch-down location $x_{TD,k+1}$ may be calculated or determined. This process of periodically measuring the lift-off location and re-calculating the next touch-down location may be performed one or more times during a given stance period. In some implementations, the control system may operate actuators of the swing leg when the touch-down location is updated in order to adjust for the updated touch-down location.

In scenarios where a robotic device has a walking gait where at least one leg is on the ground at a given point in time, the next touch-down location may be updated periodically during a given stance period until the swing leg makes initial contact with the ground at or near the most recently determined new touch-down location (based in part on the most recently measured lift-off location). In scenarios where a robotic device has a running gait where both legs may be off the ground at certain points in time, the control system may use the final lift-off measurement (taken at the moment the stance leg broke contact with the ground) in order to determine the next touch-down measurement.

FIG. 4B illustrates a schematic top-down view 430 of a robotic device moving in a forward x-direction (upward with respect to FIG. 4B). Aspects of the illustration in FIG. 4B may correspond to the robotic device 400 shown in FIG. 4A, provided from a different perspective. In the top-down view 430, the robotic device has two legs—Leg B along the left side of FIG. 4B, and Leg A along the right side of FIG. 4B. The robotic device's CoM is shown at various points in time and is illustrated using a circle with an "X." Three stance periods—k, (k+1), and (k+2)—are shown in FIG. 4B. The foot placement of each stance leg (i.e., the touch-down location) is illustrated using a concentric circle surrounding a filled circle along the line of the stance leg.

During stance period k, Leg A is the stance leg and Leg B is the swing leg. Leg A is placed at a distance $x_{TD,k}$ in front of the CoM 414 of the robotic device. The robotic device then moves forward over the planted Leg A, swinging Leg B forward until the point in time at which the robotic device has a CoM 424. At that moment, Leg A is lifted from its planted position at a distance $x_{LO,k}$ from the CoM 424. A control device of the robotic device then determines the position at which to place Leg B—$x_{TD,k+1}$—from the CoM 424 using TDLO control law, as shown in FIG. 4B. The robotic device then places Leg B at the determined location in front of CoM 424, and the stance period advances to (k+1). Note that the touchdown and lift-off positions may be positive or negative values. In this example, the touchdown positions are positive x-values (relative to the body center of mass at the moment of touchdown), while the lift-off positions are negative x-values (relative to the body center of mass at the moment of lift-off).

During stance period (k+1), Leg A becomes the swing leg and Leg B becomes the stance leg. The robotic device moves forward while Leg B is planted on the ground until its CoM reaches position 434. At that moment, Leg B is lifted from its planted position at a distance $x_{LO,k+1}$ from the CoM 434. The control device of the robotic device then determines the position at which to place Leg A—$X_{TD,k+2}$—using TDLO control law, as illustrated in FIG. 4B. The robotic device also places Leg A at the determined location in front of CoM 434, and the stance period advances to (k+2).

Note that, while FIGS. 4A and 4B show two legs—a stance leg and a swing leg—some robotic devices implementing TDLO control law may have multiple swing legs and/or stance legs at a given time. Some implementations of TDLO may consider two legs of a multi-legged robot a "pair" because they are complementary (based on their position with respect to each other on the robotic device, for example). For the purposes of this application, TDLO control law as described herein relates to bipedal robotic devices and/or multi-legged robotic devices whose legs can be complementarily paired.

In FIGS. 4A and 4B, the robotic device is moving in a one-dimensional direction along a flat surface, and thus the touch-down and lift-off positions are shown to be x-directional positions. However, the robotic device may be travelling in two dimensions, and the touch-down and lift-off positions may have x-components and y-components. Thus, the control device may determine the next touch-down position $X_{TD,k+1}$ for two dimensions.

Figure 5:
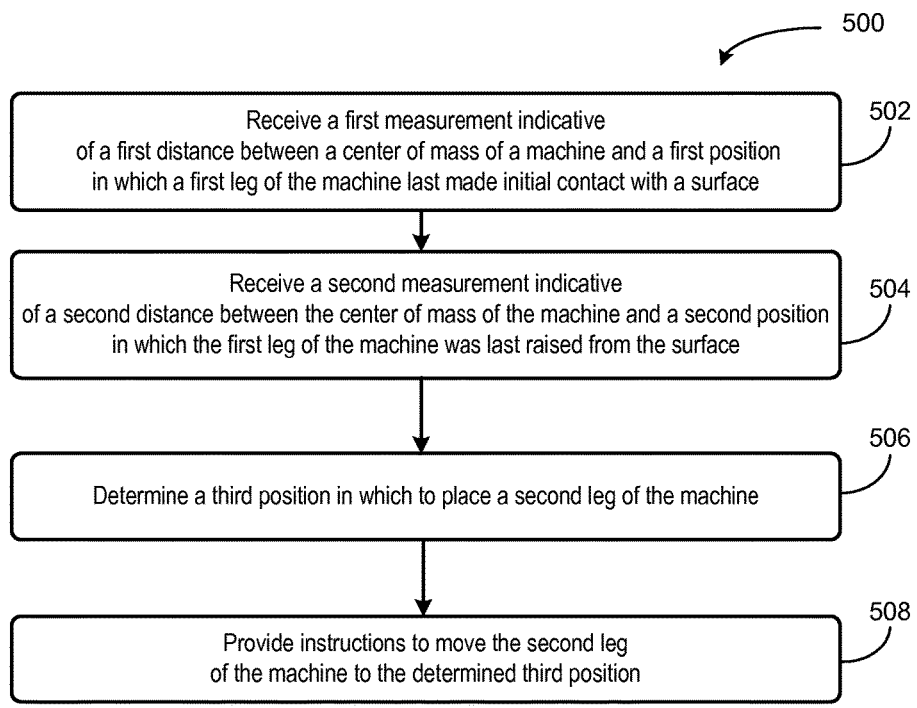
FIG. 5 is a flowchart of an example TDLO procedure, according to an example implementation.

The TDLO control law and techniques used to modify the behavior of a control system implementing TDLO are discussed in further detail with respect to FIG. 5.

FIG. 5 is a flowchart of an example TDLO procedure, according to an example implementation. The operations in the flowchart could, for example, be performed by the robotic device 100 in FIG. 1, the robotic device 200 in FIG. 2, or any combination of components from robotic device 100 and robotic device 200. FIG. 5 may include one or more operations or procedures as illustrated by one or more of blocks 502, 504, 506, and 508. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for FIG. 5 and other procedures and operations described herein, the flowchart shows the functionality and operation of one possible implementation. In this regard, each block may represent a module, a segment, or a portion of program code, which includes one or more instructions executable by a processor for implementing specific logical operations or steps in this process. The program code may be stored on any type of computer-readable medium, for example, such as a storage device including a disk or hard drive. The computer-readable medium may include a non-transitory computer-readable medium, for example, such as computer-readable media that stores data for short periods of time like register memory, processor cache and random access memory (RAM). The computer-readable medium may also include other non-transitory media, such as secondary or persistent long term storage, like read only memory (ROM), optical or magnetic disks, compact-disc read only memory (CD-ROM), for example. The computer-readable media may also be any other volatile or non-volatile storage system. The computer-readable medium may be considered a computer-readable storage medium, a tangible storage device, or other article of manufacture, for example. The program code (or data for the code) may also be stored or provided on other media including communication media. For instance, the commands may be received on a wireless communication media.

Further, for FIG. 5 and other procedures and operations described herein, each block may represent circuitry that is arranged to perform the specific logical operations.

Operations of FIG. 5 may be fully performed by a control device, or may be distributed across multiple control devices. In some examples, the control device may receive information from sensors of a robotic device, or the control device may receive the information from a processor that collects the information. The control system might further communicate with a remote control system (e.g., a control device on another robotic device) to receive information from sensors of other devices, for example. For the purposes of explanation, the operations of blocks 502, 504, 506, and 508 are described as being performed by a control device; however, other devices as described above may carry out the operations.

The following operations of blocks 502, 504, 506, and 508 describe using measurements recorded within a particular stance period in order to determine foot placement in the following stance period. As described above, this may involve taking measurements from a stance leg and using them as a basis to determine the placement of a swing leg. Upon moving the swing leg to the determined position and planting its foot on the ground, that swing leg becomes the stance leg for the following stance period.

At block 502, a control device receives a first measurement indicative of a first distance between a CoM of a machine and a first position in which a first leg of the machine made initial contact with the surface. The first leg may refer to the stance leg in the previous stance period. In some cases, the position in which the stance leg of the machine initiated contact with the surface may be similar to the position 418 of the stance leg depicted in FIG. 4A. The measurement may be similar to or based on $x_{TD,k}$ depicted in FIG. 4A. As described herein, "initial contact" may refer to the point in time at which the foot of a robotic leg transitions from swinging forward to being planted on the ground. Note that each step may have an "initial contact."

The control device may be configured to receive the first measurement from one or more sensors coupled to portions of the robotic device. The sensors may measure the position, velocity, acceleration, and orientation of the legs of the robotic device. In an example implementation, each robotic leg has sensors coupled to the joints of that leg that measure the angles of those joints. The control device may have stored thereon a model of the robotic device that correlates a set of joint angles with a distance that the stance leg is from the CoM of the robotic device. Using known dimensions of the components of a given robotic leg and its connection point to the robotic device's body, a control device can determine the location of the foot of the robotic leg with respect to the robotic device's body and/or CoM. This technique of determining foot position based on joint angles may be referred to as "forward kinematics." The control device may then provide joint angles measured at a time in which the stance leg initiates contact with a surface to the model to determine the first measurement. In another example implementation, each robotic leg of the robotic device includes an inertial measurement unit (IMU) that senses the robotic leg's velocity, orientation, and acceleration. Regardless of the particular implementation, the position of the foot of the robotic leg with respect to the robotic device's body and/or CoM may be determined from sensor information and, taken at the moment at which the robotic leg makes initial contact with the ground, serve as the first measurement.

In some cases, the foot positions may be measured with respect to gravity. Put differently, the direction of the gravitational force (e.g., due to Earth's gravity) may define an axis or set of axes against which the touchdown and lift-off measurements may be recorded. For example, the direction of the force of gravity may point in the negative z-direction, and a plane normal to that gravity vector may define the robotic device's x-y plane. In some implementations, the direction of gravity may be measured or otherwise determined using a sensor, such as an IMU. Thus, if a robotic device is walking along a sloped surface (e.g., a surface with some degree of inclination or changes in height), the touch-down and lift-off locations may be measured with respect to a plane normal to the gravity vector (rather than a plane defined by sloped or inclined surface).

In some implementations, a robotic device is configured to include a sensing system. The sensing system may receive data from a plurality of sensors and calculate a position, orientation, and velocity of each robotic leg and/or feet of that robotic leg. The sensing system may also determine the position, orientation, and velocity of the CoM of the robotic device. The sensing system may then provide the calculated one or more of the position, orientation, and velocity measurements to the control device. The sensing system may use any combination of measurements from, for example, an IMU coupled to the robotic device's body and/or various joint angle sensors in order to determine the position, orientation, velocity, and/or acceleration of one or more parts of the robotic device. A control device of the robotic device may consider the robotic device's body orientation, velocity, and/or acceleration in determining the next touch-down location that improves the robotic device's balance. For instance, if the robotic device's body is pitched forward (i.e., tilted downward in the forward direction), the touch-down location of the next stance leg may need to be modified to take into account the body orientation.

At block 504, a control device receives a second measurement indicative of a second distance between the CoM of a machine and a second position in which the first leg (e.g., the stance leg) of the machine leaves the surface. In some cases, the position in which the stance leg of the machine last broke contact with the surface may be similar to the position 428 of the stance leg in FIG. 4A. The measurement may be similar to $x_{LO,k}$ depicted in FIG. 4A. As described herein, "last raised" may refer to the point in time at which the foot of a robotic leg transitions from being planted on the ground to lifting off the ground and swinging forward.

Similarly to the operation at block 502, the control device may be configured to receive the second measurement from one or more sensors coupled to portions of the robotic device. As described above, the sensors may measure the position, velocity, acceleration, and orientation of the legs of the robotic device. In some cases, the control device receives these measurements and calculates or otherwise determines the distance between the CoM of the robotic device and the position in which the stance leg of the machine was raised from the surface. In some implementations, the control device may receive the second measurement from a sensing system, such as the previously described sensing system.

At block 506, the control device determines a third position in which to place a second leg of the machine based on the received first measurement and the received second measurement. The second leg may refer to the swing leg in the previous stance period. The control device may implement an open-loop or closed-loop controller that utilizes the first measurement and the second measurement as feedback to determine the following touch-down position. The control device may determine the touch-down position for the second leg in order to achieve balance control. Further, the control device may provide estimations of each robotic leg's velocity and acceleration to other devices or systems coupled to the robotic device. In some cases, the third position in which to place the second leg of the machine may be similar to position 426 of the swing leg in FIG. 4A.

In order to achieve robust balance sensing and control, a "touch-down lift-off" (which may be referred to herein as "TDLO") control law may be employed by a control circuit, a computing device, or a programmable logic device (PLD) such as a field-programmable gate array (FPGA). The TDLO control equation is based on a linear-inverted pendulum (LIP) model adapted to legged robotic devices that utilizes two time-separated measurements of a position of a robot's stance leg relative to the CoM of the robotic device in order to determine foot placement of the robot's swing leg to achieve balance control and/or other control goals. The results of the TDLO control equation also provide information about the state of the robot's balance. Additionally, the TDLO control equation outputs may be used as a basis to control the leg of the robot.

The equation governing TDLO control law may be used to determine a position in which to next place a swing leg in order to maintain the balance of the robot. A legged robot—such as a bipedal robot or a quadruped robot, among others—may be configured to have legs that are not directly beneath the robot's CoM. In robotic devices with four or more legs, the TDLO control equation may measure the touch-down and lift-off locations of two or more stance legs and use those measurements as a basis to determine the following touch-down positions for two or more swing legs. Thus, in some implementations, the TDLO control equation may be modified to use a forcing function or other offset factor to embed the leg configuration of the robotic device to produce a more natural stepping pattern. The forcing function may also be adjusted to influence the trajectory of a legged robot, which may cause the robotic device to laterally turn or move forward. Further, the forcing function may be modified to alter the robot's pace and gait.

In some implementations, the TDLO control equation calculates a next foot location for a swing leg based on linear combinations of two previous leg position measurements from a stance leg and a pair of gain coefficients. The first measurement indicates a position in which the stance leg made initial contact with the ground, which is denoted herein as $x_{TD,k}$ where TD represents "touch down" and k represents a discrete stance period associated with the most recent measurement. The second measurement indicates a position in which the same leg was raised from the ground, which is denoted herein as $x_{LO,k}$, where LO represents "lift off." The values of the gain coefficients, which are denoted as $j_x$ and $b_x$, may be selected or otherwise calculated in order to stabilize the robot and to provide a desired effective natural frequency and amount of damping. In some embodiments, the gain coefficients $j_x$ and $b_x$ are determined using the height of a robot's CoM above the ground and a nominal stance duration k as parameters of LIP control. Selection of gain coefficients $j_x$ and $b_x$ is discussed below in greater detail.

The TDLO control equation may be written as:

$$x_{TD,k+1} = j_x(x_{TD,k} - x_{LO,k}) - b_x(x_{TD,k} + x_{LO,k}) \quad [1]$$

The TDLO control equation [1] determines the next position at which to place the next stance leg in the x-dimension. The TDLO equation above may be applied to other dimensions, such as the y-dimension, to determine the position at which to place the leg in the y- as well. The x- and y-, components of the position at which to place the leg may be combined, along with the z-height of the ground, to represent a three-dimensional position, and the control device may subsequently control the robotic leg to move to the determined three-dimensional position. In various implementations, the TDLO control law may only consider measurements taken in two dimensions, such as the x- and y-dimensions, while not explicitly recording and controlling the leg placement on the basis of z-dimensional measurements.

Additionally, portions of the TDLO control equation [1] are approximately proportional to the velocity $v_x$ and acceleration $a_x$ of the robot's center-of-mass. These may be written as:

$$v_x \sim x_{TD,k} - x_{LO,k} \quad [2]$$

$$a_x \sim -(x_{TD,k} + x_{LO,k}) \quad [3]$$

In this manner, TDLO can be thought of as being similar to proportional-derivative (a.k.a. "PD") control on robot center-of-mass velocity.

The velocity and acceleration of the center-of-mass implied by portions of the TDLO control equation [1] of the robotic device may be used to inform other control or estimation systems coupled to the robot. The velocity and acceleration estimations provided by the TDLO equations do not require differentiation of the measured position of a leg of the robotic device and thus is less susceptible to noise. Further, unlike explicit velocity calculations that differentiate position measurements, the estimated velocity can be quickly calculated, and, with the LIP model, removes much of the phase lag typically resulting from explicit velocity calculations, leading to better stability of the robotic device.

Figure 6A:
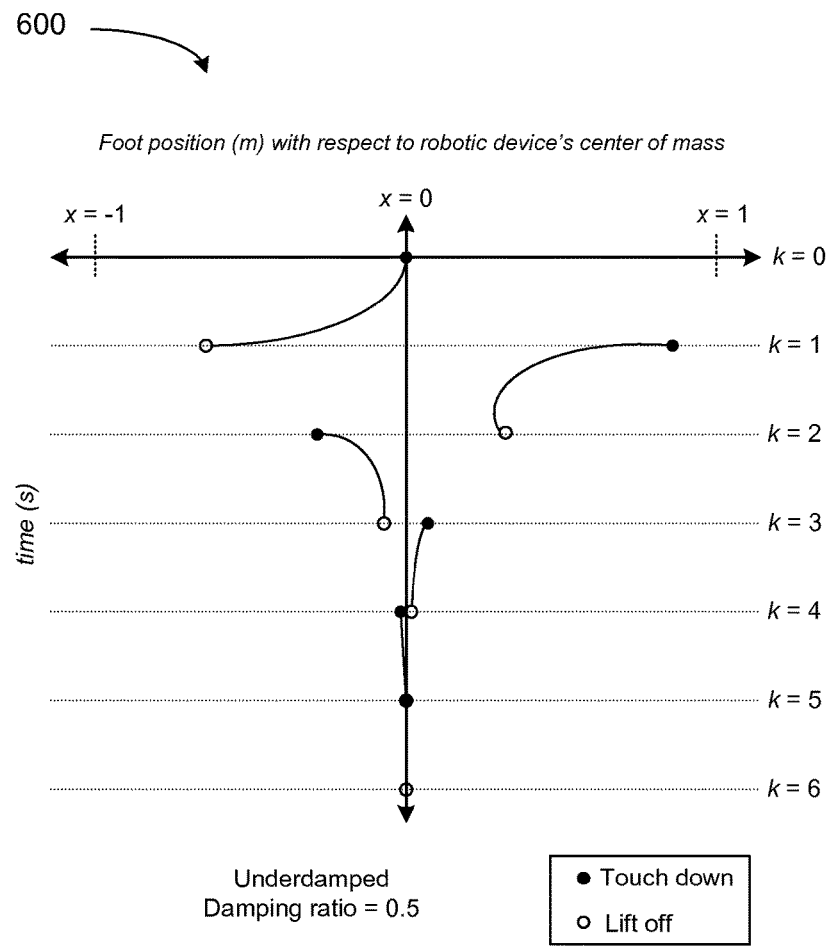
FIG. 6A, FIG. 6B, and FIG. 6C are graphics illustrating foot positions relative to a robotic device's center of mass over time, according to an example implementation.
Figure 6B:
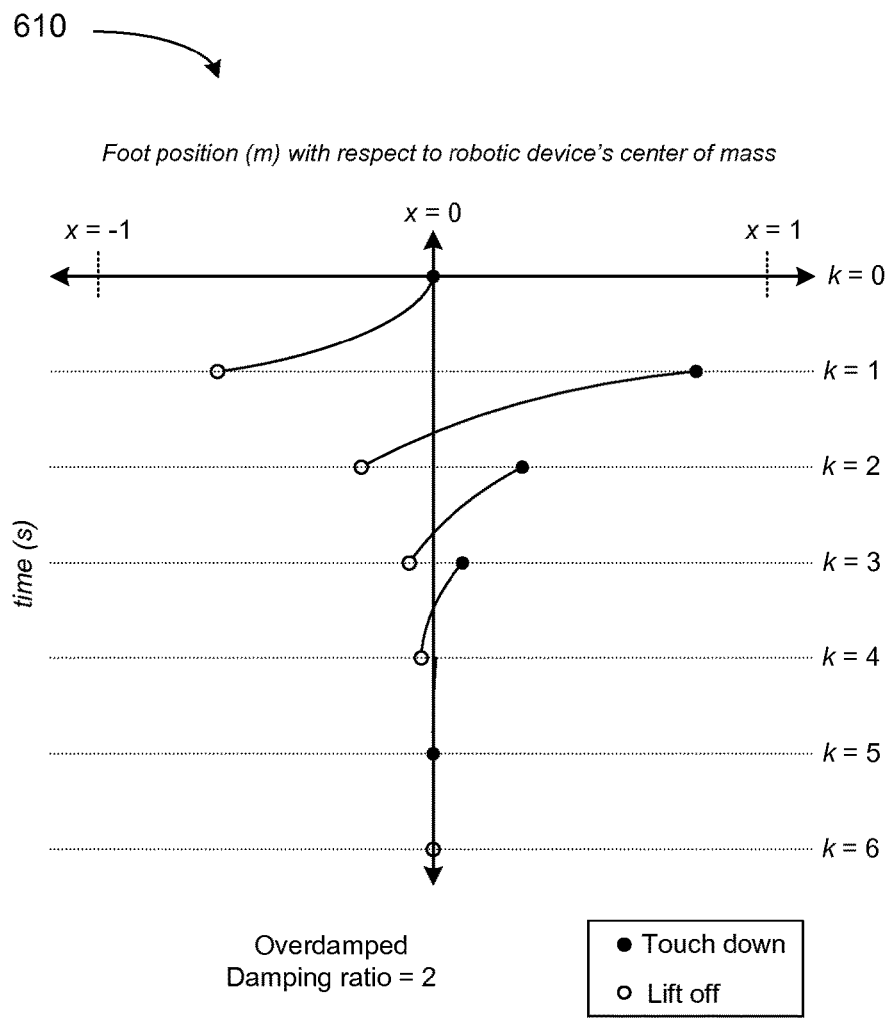
Figure 6C:
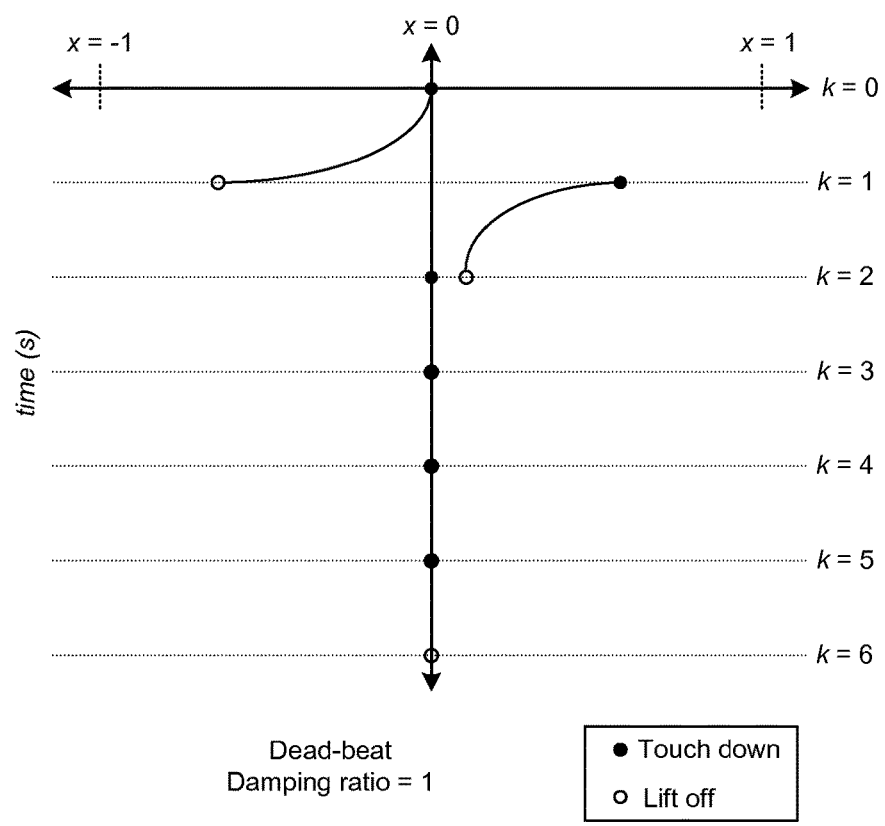

In equation [1] above, $x_{TD,k+1}$ represents the location in which to place the next stance leg in order to maintain balance. Thus, at block 506, the control device can use the first measurement $x_{TD,k}$ and the second measurement $x_{LO,k}$ as a basis for determining the next location to place the next stance leg of the robotic device $x_{TD,k+1}$. The gain values $j_x$ and $b_x$ are related to the desired dynamic response of the system to a disturbance, which could be represented by an effective natural frequency and damping ratio, and may be adjusted to increase or decrease the rate and shape of disturbance decay. In an example operation, if a robotic device experiences an externally applied lateral force, the natural frequency and damping ratio determines how quickly, and with what oscillation, the robotic device will return to its original position and/or velocity. The damping ratio may be a dimensionless number between 0 (representing an undamped system) and any positive number, where a damping ratio between 0 and 1 represents an underdamped system, a damping ratio equal to 1 represents a critically damped system, and a damping ratio greater than 1 represents an overdamped system. Disturbance responses with higher desired natural frequencies will correct more quickly for tracking errors. Because TDLO operates on the discrete stepping system of a legged robot, a critically-damped response, with sufficiently high natural frequency, will approach a "dead-beat" response in which the system will return to the desired set-point (i.e., at equilibrium) in the minimum possible time. Example plots depicting TDLO responses for an underdamped system, an overdamped system, and a dead-beat system are illustrated in FIG. 6A, FIG. 6B, and FIG. 6C, respectively.

In some embodiments, the gain values $j_x$ and $b_x$ are calculated to provide stable balance control for a LIP. The approximate height of the robotic device's CoM, the stance duration (i.e., the length of time for each discrete k), the desired natural frequency of the velocity response, and a desired damping ratio may all be used in calculating stable gain values $j_x$ and $b_x$.

The following section describes one method of choosing the control gains, $j_x$ and $b_x$, using pole-placement (i.e., eigenvalues) of the final discrete closed-loop system. In calculating these gain coefficients, the legged robot is considered to behave similarly to a LIP. In the following equations, g represents acceleration due to gravity and is equal to 9.81 m/s², z is equal to the height of the robotic device's CoM (in meters), $T_s$ is equal to the stance duration per discrete k (in seconds), fn is equal to the desired natural frequency of the velocity response (in Hz), $\lambda_n$ is the same frequency (in radians per second), and dr represents the desired damping ratio. Additionally, $\lambda$ represents the modeled pendulum "tipping" frequency (in radians per second) of the LIP.

$$\lambda = \sqrt{\frac{g}{z}} \quad [4]$$

$$\lambda_n = 2\pi * fn \quad [5]$$

Equations [6] and [7] are used to determine continuous-time poles $s_1$ and $s_2$:

$$s_1 = -dr*\lambda_n + \lambda_n\sqrt{dr^2-1} \quad [6]$$

$$s_2 = -dr*\lambda_n - \lambda_n\sqrt{dr^2-1} \quad [7]$$

Note that poles $s_1$ and $s_2$ may be real numbers when the specified damping ratio dr is greater than or equal to 1, and complex numbers when the damping ratio dr is less than 1. Next, another set of intermediate values $p_1$ and $p_2$, which represent poles of the discrete step-to-step system in the transfer function used to calculate gain values $j_x$ and $b_x$, are calculated using equations [8] and [9], respectively.

$$p_1 = e^{T_s*s_1} \quad [8]$$

$$p_2 = e^{T_s*s_2} \quad [9]$$

Using these pole-placement values, determined from the desired fn and dr, and the other determined parameters, the gain values $j_x$ and $b_x$ may be calculated using equations [8] and [9]. Such calculations may provide gain values that stabilize a LIP.

$$j_x = \frac{(1 + e^{2\lambda T_s} + 2e^{\lambda T_s} * (-p_1 - p_2 + p_1 p_2))}{2(-1 + e^{\lambda T_s})^2} \quad [8]$$

$$b_x = \frac{(1 + e^{2\lambda T_s} - 2e^{\lambda T_s} * (p_1 + p_2 + p_1 p_2))}{2(1 + e^{\lambda T_s})^2} \quad [9]$$

At block 508, the control device provides instructions to move the next stance leg of the machine to the determined third position.

In some implementations, the instructions are provided directly to the actuators on the robotic device to control the placement of the leg of the robotic device. As noted above, the instructions may be computer program instructions to a computing device that controls the movement of the robotic leg. In some implementations, the instructions may be provided directly from the control device to actuators on the robotic leg. In some instances, an actuator is controlled by supplying an analog or digital signal to a dedicated driver that operates the actuator. In other instances, the control device incorporates the circuitry or digital logic used to operate the actuator, such that the control device may extend or retract each actuator without a separate driver.

The instructions to move the leg of the robotic device may include any number of digital or analog signals that operate electromechanical devices on the robotic leg, such as a hydraulic, pneumatic, or electrical actuator. The signals may be provided to various components in a synchronized manner to lift the robotic leg and place it at the determined touch-down location that maintains the balance of the robotic device.

FIGS. 6A, 6B, and 6C illustrate example plots of TDLO responses configured to have various damping ratios. The plots are oriented such that the horizontal axis indicates the foot position (e.g., in meters) with respect to a robotic device's CoM. A continuous line or curve that sweeps horizontally is indicative of the CoM of the robotic device "swaying" or moving above the planted foot. The vertical axis indicates a progression through time, where the top of the plot indicates the discrete stance interval k=0, and moving downward through the plot advances k. Each filled-in dot at one end of a curve represents a point of touch down, while each empty dot at the other end of the curve represents a point of lift off. A dot that is far from the center axis of x=0 indicates that the foot position is far from the CoM of the robotic device. Conversely, a dot that is near or aligned with the center axis of x=0 indicates a foot position that is nearly or directly below the robotic device's CoM. Thus, a stable TDLO response converges to the center axis of x=0.

For the purposes of explanation, x indicates a left-right position of a foot with respect to the robotic device's CoM. The x values represent displacement in one-dimension. Any number of dimensions (e.g., two dimension or three dimensions) may be factored into a particular TDLO response. The single-dimension examples disclosed herein are provided for explanatory purposes, and are not meant to limit TDLO control to one dimension.

FIG. 6A illustrates an example plot 600 of an underdamped TDLO response using a damping ratio of 0.5. The plot 600 depicts the robotic device's CoM "swaying" above the planted foot; that is, the CoM is moving in one direction until the following step, at which point the CoM begins moving in the opposite direction. The foot position with respect to the robotic device's CoM (which may be simply referred to herein as "relative foot position") in response sways from being on one side of the robotic device's CoM to the other side of the robotic device's CoM in order to correct the perturbation. The foot placement determined by the underdamped TDLO control attenuates this swaying from stance interval k=0 to k=6. In this example, it is not until k=7 that the steady-state relative foot position beneath the robotic device's CoM is achieved.

FIG. 6B illustrates an example plot 610 of an overdamped TDLO response using a damping ratio of 2. The plot 610 depicts the robotic device's CoM moving in one direction (in this example, the positive x-direction) above the planted foot. After k=0, the relative foot position in response moves in the same direction as the robotic device's motion to slow the motion of the robotic device's CoM. The foot placement determined by the overdamped TDLO control reduces the robotic device's CoM velocity by progressively taking shorter steps in the positive x-direction until the robotic device slows to a halt from stance interval k=0 to k=6. In this example, like the underdamping TDLO control, it is not until k=7 that the steady-state relative foot position beneath the stationary robotic device's CoM is achieved. Note that, in this overdamped TDLO control example, the robotic device's ending stationary position may be some distance from the robotic device's initial position.

FIG. 6C illustrates an example plot 620 of a dead-beat TDLO response using a damping ratio of 1. The plot 620 depicts the robotic device's CoM initially moving in the positive x-direction during k=0, then slowing down (e.g., accelerating in the negative x-direction) during k=1, and finally coming to rest at k=2. Unlike the underdamped and overdamped TDLO control examples shown in FIGS. 6A and 6B, the dead-beat TDLO response stabilizes the robotic device in a shorter time (i.e., in fewer stance durations k). While such a dead-beat response may appear to be ideal, there may be physical limitations on a robotic device's joints and actuators that would make achieving this rapid of a stabilization difficult. Note that some robotic devices may be capable of achieving a dead-beat or near dead-beat response, depending upon the physical attributes of the robotic device's joints and actuators. Furthermore, underdamped TDLO or overdamped control may be desired, depending on the arrangement of a particular robotic device.

Note that the time axis may not represent a continuous time axis. While the plots shown in FIGS. 6A, 6B, and 6C show the touch-down and lift-off points occurring simultaneously, a response from a physically implemented TDLO-controlled robotic device might have a separation in time between touch-down and lift-off. Both the time axis and the foot position axis may not necessarily be drawn to scale or correspond to a particular set of gain values, damping ratio, natural frequency of velocity response, or stance height. The plots shown in FIGS. 6A, 6B, and 6C are provided to facilitate understanding and not necessarily to represent any particular set of values or specific scenario.

The above-described TDLO principles and techniques may be extended to include velocity control and/or yaw control. One TDLO control technique involves stepping in order to bring the robotic device to a stop. This may be accomplished by regulating the robotic device's touchdown positions to converge to a location below the robot's CoM. In this example, the robotic device's "heading-frame"—that is, a virtual reference frame that serves as a basis for TDLO-based calculations—may be defined by the robot's CoM. The swing leg's next touchdown position may therefore be determined on the basis of two metrics: (i) the stance leg's most recent touchdown position with respect to the robot's CoM at the moment the touchdown occurred, and (ii) the stance leg's most recent liftoff position with respect to the robot's CoM at the moment the liftoff occurred. Thus, the two metrics may represent measurements taken in two different heading-frames corresponding to two different points in time.

This heading-frame paradigm may serve as an extension to TDLO for controlling the robotic device's speed and direction. Consider an example scenario where a robotic device is instructed to walk at a constant speed. A constant, straight-line (e.g., no turning or changes in yaw) walk may be accomplished by designating the heading-frame to a location near the robotic device's CoM. For example, instead of measuring the touchdown and liftoff stance foot positions with respect to the robotic device's CoM, the touchdown and liftoff positions may be measured with respect to a location "behind" the robotic device's CoM. Whereas TDLO using a CoM-centered heading-frame may cause the robot to slow to a stop, TDLO using a CoM-offset heading-frame may cause the robot to maintain a particular velocity (which may be proportional to the extent of offset from the robot's CoM). In this manner, the TDLO control techniques described herein may be extended to cause the robotic device to maintain a constant speed.

The heading-frame paradigm may also extend TDLO to allow for yaw control. Consider an example scenario where a robotic device is instructed to walk in a circle (e.g., a constant speed and a constant yaw rate). Such a walk may be accomplished by utilizing a heading-frame that is both offset from the robotic device's CoM (to provide the constant forward walking speed) and is configured to rotate at a particular yaw rate. Thus, the heading-frame at the moment of the most recent stance leg liftoff may be rotated compared to the heading-frame at the moment of the most recent stance leg touchdown (because the heading-frame is configured to rotate over time, and the two measurements are separated in time). When the heading-frame is rotated over time, TDLO may respond by attempting to compensate for this virtual rotation by stepping in a manner that causes the robot to turn.

Figure 7A:
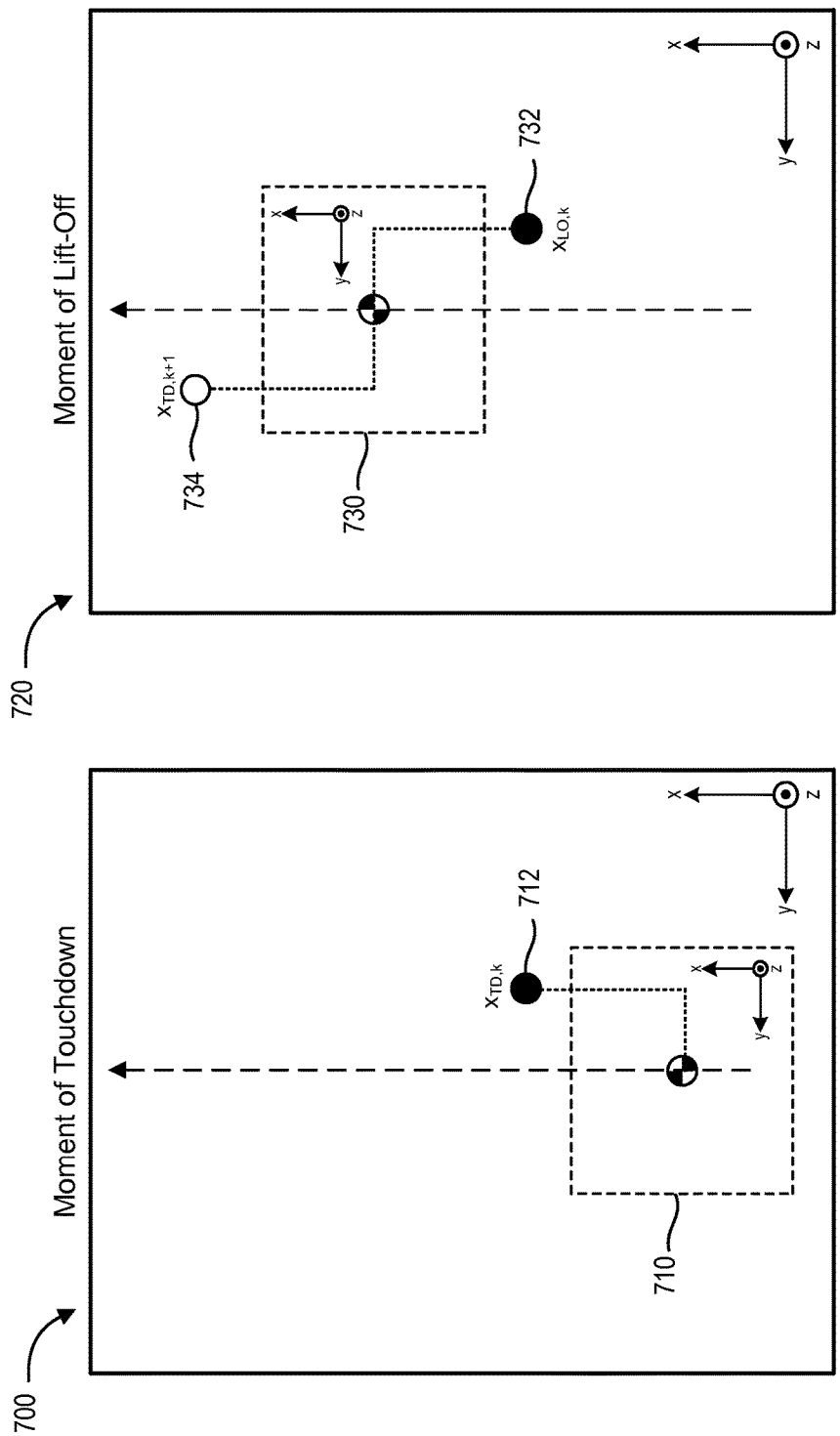
FIG. 7A illustrates a top-down view of straight-line TDLO stepping, according to an example implementation.
Figure 7B:
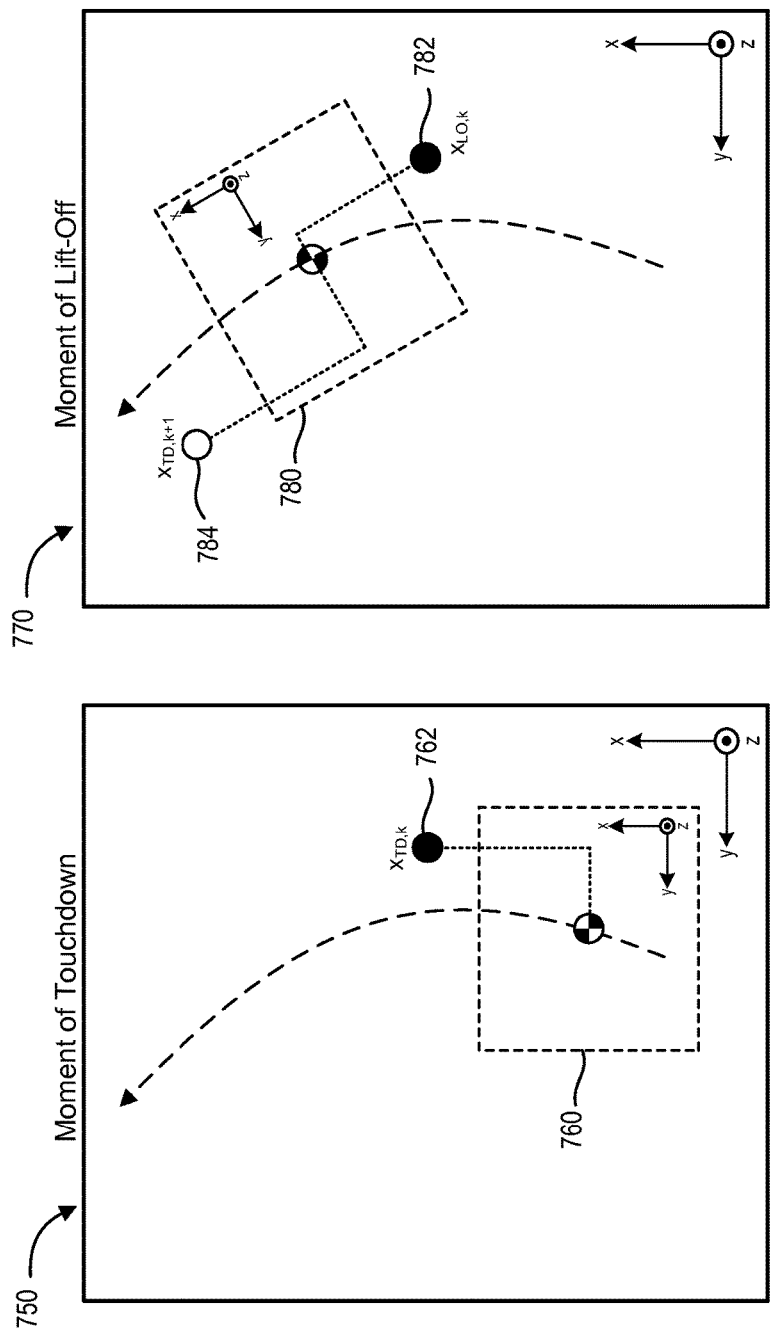
FIG. 7B illustrates a top-down view of TDLO stepping with a constant yaw, according to an example implementation.

FIGS. 7A and 7B illustrate top-down views of example TDLO-based walking scenarios. The dotted rectangles represent heading-frames at particular points in time. The patterned circles at the centers of each dotted rectangles represent the robotic device's CoM with respect to its heading-frame. The filled-in circles represent the locations of the stance leg, and the dotted lines connecting the filled-in circles to the patterned circles represent the relative displacement between the CoM and the location of the stance leg in the x- and y-directions. The white circles represent the swing leg's touchdown location, and the dotted lines connected the white circles to the patterned circles represent the relative displacement between the CoM and the next touchdown location for the swing leg in the x- and y-directions of the associated heading-frame. Note that the touchdown and lift-off locations are measured against different heading-frames. The dashed lines with the arrow running through the robotic device's CoM in each heading-frame represents the robotic device's overall motion (e.g., the robotic device's CoM trajectory).

FIG. 7A illustrates a top-down view of an example straight-line walking TDLO scenario. Moment 700 illustrates the position of the robotic device's CoM and the stance leg's touchdown position 712 at the moment when the stance leg makes initial contact with the ground. The touchdown position 712 may be measured using a coordinate system defined by the heading-frame 710. The heading-frame 710 may be configured to move in the positive x-direction, similarly to the constant-speed walking example described above.

After the robotic device's stance leg is planted on the ground at touchdown position 712, the robotic device's CoM moves forward (e.g., in the positive x-direction) over that planted stance leg until moment 720. Moment 720 illustrates the position of the robotic device's CoM and the stance leg's lift-off position 732 at the moment when the stance leg begins to lift off the ground. The lift-off position 732 may be measured using a coordinate system defined by the heading-frame 730. In this example, the coordinate systems between heading-frame 710 and heading-frame 730 have the same orientation (although they are translated by an amount proportional to the change in position of the robotic device's CoM). Note that, with respect to absolute position (e.g., "world" position), the touchdown position 712 and the lift-off position 732 may be the same location on the ground.

In the straight-line walking example, the touchdown position 712 and the lift-off position 732 measured against their respective heading-frames may have the same amount of y-directional displacement, but differing x-directional displacement. Thus, when these foot measurements are applied to TDLO, the swing leg's touchdown position 734 may be located such that stepping at that location causes the robotic device's CoM to move in the positive x-direction, while the relative y-position of the robotic device's CoM remains constant.

FIG. 7B illustrates a top-down view of an example TDLO-based walking scenario with turning. Moment 750 illustrates a heading-frame 760 that has a similar orientation to the heading-frame 710 at moment 700. Additionally, the touchdown position 762 measured with respect to the heading-frame 760 may be similar to the touchdown position 712 measured with respect to heading-frame 710.

However, unlike the example in FIG. 7A, the heading-frame in FIG. 7B is configured to rotate in a counterclockwise direction (from the top-down perspective) at a constant rate. Therefore, at moment 770, the heading-frame 780 is rotated compared to the heading-frame 760. As a result, the stance leg's lift-off position 782 measured using the coordinate system defined by heading-frame 780 is different than the lift-off position 732. When the touchdown position 762 and the lift-off position 782 (measured relative to the rotated coordinate system defined by the heading-frame 780) are applied to TDLO control law, the swing leg's touchdown position 784 may be located such that stepping at that location causes the robotic devices' CoM to move in both a positive x-direction and a positive y-direction (e.g., forward-motion turning). Note that the absolute position of the swing leg touchdown position 784 may be different from the absolute position of the swing leg touchdown position 734. Thus, as illustrates in FIG. 7B, rotating the heading-frame over time may induce TDLO control law to cause the robot to turn.

As a general matter, moving, rotating, translating, or otherwise modifying the heading-frame (e.g., the frame of reference from which the TDLO measurements are recorded) may cause the robot to correct, compensate, or otherwise modify its future stepping locations. In some implementations, the heading-frame may be translated or rotated in a time-synchronized manner in order to carry out a choreographed set of movements using TDLO control law. Any combination of rotations and/or translations may be applied to the heading-frame for any number of steps (or for any length of time) without departing from the scope of the present application.

One way to modify TDLO control law to implement the heading-frame modifications described above is to utilize a forcing function. An example forcing function may be a one- or two-dimensional offset (e.g., in the x-direction and/or the y-direction) that effectively alters the location around which TDLO-based stepping stabilizes.

The following description provides some example mathematical relationships that may be used to extend TDLO control law to include velocity control and/or yaw control. The mathematical relationships and equations described below are provided for explanatory purposes and illustrate one example forcing function-based implementation. Other mathematical relationships that depend upon different parameters and/or different robotic models may also be used to implement the heading-frame-based TDLO control described herein.

During a turning operation, control quantities (such as foot positions) may be measured with respect to a yawing coordinate system. In some implementations, one horizontal axis (e.g., the x-axis, or the longitudinal axis) of this yawing coordinate system may nominally point in the desired direction of travel for the robot. This coordinate system may be referred to herein as the "heading-frame." In this paradigm, TDLO control may be performed in two horizontal axes simultaneously (e.g., the x-axis and y-axis, or the longitudinal axis and lateral axis). The touchdown position of the stance leg $\{x_{TD,k}, y_{TD,k}\}$ may be measured with respect to the heading-frame at the moment of touchdown, while the lift-off position of the stance leg $\{x_{LO,k}, y_{LO,k}\}$ may be measured with respect to the heading-frame at the moment of lift-off. During a steady-state turn, the heading-frames at touchdown and lift-off may not be aligned, but may instead have a rotational yaw-offset proportional to the turning rate and the amount of time between touchdown and lift-off. During this steady-state turning, the touchdown positions expressed with respect to the heading-frame at touchdown converge to the following relationships shown in equations [10] and [11]:

$$\bar{x}_{TD} = \frac{\dot{x}_k}{\lambda \sinh(\lambda T_s)} (\cosh(\lambda T_s) - \cos\theta_z) \quad [10]$$

$$\bar{y}_{TD} = \frac{-\dot{x}_k}{\lambda \sinh(\lambda T_s)} \sin\theta_z \quad [11]$$

Where $T_s$ is the stance period duration (in seconds), $\theta_z$ is the total yaw change (in radians) occurring over $T_s$, and $\dot{x}_k$ is the forward speed (in m/s) at the moment of touchdown. When performing TDLO with respect to a yawing heading-frame, the TDLO control of equation [1] may be written as equations [12] and [13]:

$$\begin{bmatrix} x_{TD,k+1} \\ y_{TD,k+1} \end{bmatrix} = J_{2\times 2} \begin{bmatrix} R_Z^T(\theta_z) \begin{bmatrix} x_{TD,k} \\ y_{TD,k} \end{bmatrix} - \begin{bmatrix} x_{LO,k} \\ y_{LO,k} \end{bmatrix} \end{bmatrix} - \quad [12]$$

$$B_{2\times 2} \begin{bmatrix} R_Z^T(\theta_z) \begin{bmatrix} x_{TD,k} \\ y_{TD,k} \end{bmatrix} + \begin{bmatrix} x_{LO,k} \\ y_{LO,k} \end{bmatrix} \end{bmatrix} + \begin{bmatrix} \Delta_x \\ \Delta_y \end{bmatrix}$$

$$R_Z^T(\theta_z) = \begin{bmatrix} c\theta_z & -s\theta_z \\ s\theta_z & c\theta_z \end{bmatrix} \quad [13]$$

Here $J_{2\times 2}$ and $B_{2\times 2}$ are 2×2 matrices of TDLO gains, and $c\theta_z = \cos(\theta_z)$ and $s\theta_z = \sin(\theta_z)$. Given the steady-state touchdown positions specified above, the TDLO forcing terms $[\Delta_x, \Delta_y]$ can be derived, as shown in equation [14]:

$$\begin{bmatrix} \Delta_x \\ \Delta_y \end{bmatrix} = \begin{bmatrix} \begin{bmatrix} 1 & 0 \\ 0 & 1 \end{bmatrix} - \quad [14]$$

$$(K_{2\times 2} - B_{2\times 2}) R_Z^T(\theta_z) + (K_{2\times 2} + B_{2\times 2}) \begin{bmatrix} -1 & 0 \\ 0 & 1 \end{bmatrix} \begin{bmatrix} \bar{x}_{TD} \\ \bar{y}_{TD} \end{bmatrix}$$

Forcing TDLO with these values $[\Delta_x, \Delta_y]$ (i.e., incorporating the forcing terms into TDLO control law) may cause TDLO to coordinate the horizontal center-of-mass motion with the current heading direction. In this manner, TDLO control law may be extended to control the magnitude and direction of the robotic device's CoM velocity. A computing device, human interface device, and/or another planning or control system may specify these forcing values—as either constant values or time-varying values—in order to cause the robot to turn in a desired manner. The resulting TDLO control law including the forcing function term may be written as shown below in equation [15]:

$$x_{TD,k+1} = j_x(x_{TD,k} - x_{LO,k}) - b_x(x_{TD,k} + x_{LO,k}) + \Delta_k \quad [15]$$

The forcing function term $\Delta_k$ may, in some instances, be different for each foot step. A set of $\Delta_k$ values may be specified that causes the robotic device to perform acyclic stepping motions. For example, the forcing function may specify an offset for a few stance periods k that causes the robotic device to turn during those stance periods k, but then continue walking in a straight line thereafter. As another example, the forcing function may contain a set of values that cause the robotic device to step in accordance with a pre-determined stepping pattern (e.g., performing the "cha-cha" dance). Further, the forcing function term $\Delta_k$ may not only vary from step-to-step (e.g., for different values of k), but may also vary during a given stance period k. Regardless of the particular implementation, the forcing function term $\Delta_k$ may be a constant value, a set of values, and/or may vary between stance periods or over time.

Note that, in some implementations, the value of the forcing function may be generated based on a joystick input and/or other peripheral input. For example, if a user pushes a joystick in a forward direction, the joystick or a computing device may generate a forcing function value proportional to the extent to which the joystick was pushed forward. This input value may be provided to a robotic device's control system, which may modify the forcing function term in the control system's TDLO control law. In this manner, a user may control the robotic device using an input device.

The TDLO control principles described above may be implemented as a part of a larger control system and/or planning system for a robotic device. For example, a robotic device may have a perception system configured to observe the environment and detect possible obstacles or objects proximate to the robotic device. The robotic device's control system and/or planning system—which may implement TDLO control as described herein—may be configured to avoid obstacles and/or objects within its planned path or trajectory (e.g., objects that the robotic device may possibly collide with). In some implementations, the planning system may be configured to modify the forcing function in order to alter the robotic device's direction of motion (and resulting trajectory) to avoid colliding with that object.

Figure 8:
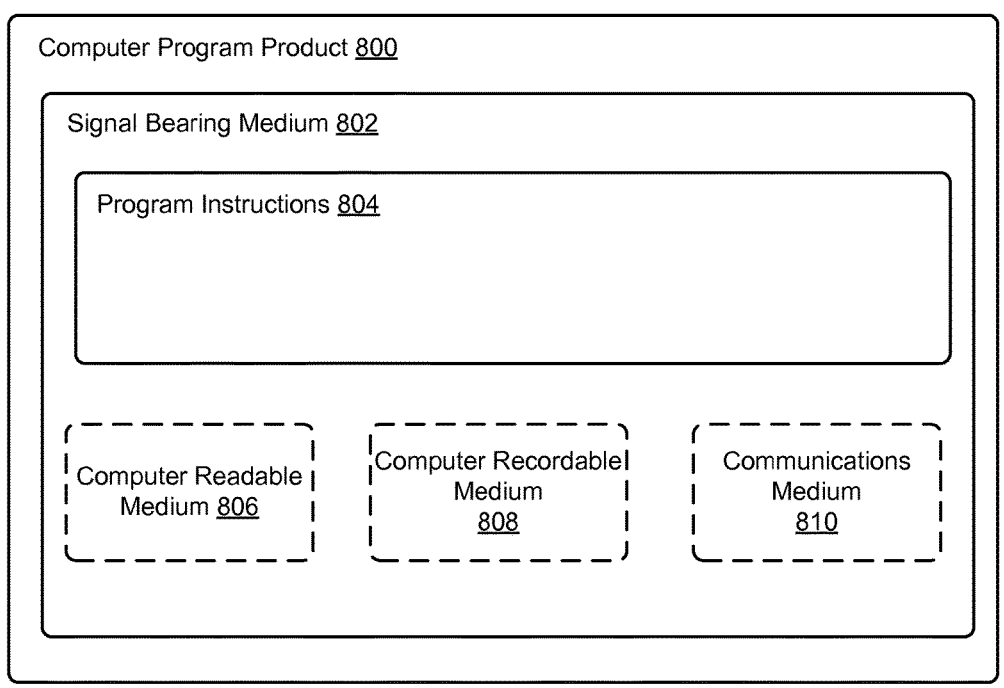
FIG. 8 is a computer-readable medium configured according to an example implementation.

FIG. 8 illustrates an example computer-readable medium configured according to at least some implementation described herein. In example embodiments, an example system can include one or more processors, one or more forms of memory, one or more input devices/interfaces, one or more output devices/interfaces, and machine readable instructions that when executed by the one or more processors cause the system to carry out the various operations, tasks, capabilities, etc., described above.

As noted above, the disclosed procedures can be implemented by computer program instructions encoded on a computer-readable storage medium in a machine-readable format, or on other media or articles of manufacture. FIG. 8 is a schematic illustrating a conceptual partial view of a computer program product that includes a computer program for executing a computer process on a computing device, arranged according to at least some implementations disclosed herein.

In one embodiment, the example computer program product 800 is provided using a signal bearing medium 802. The signal bearing medium 802 may include one or more program instructions 804 that, when executed by one or more processors may provide operations or portions of the operations described above with respect to FIGS. 1-5, FIGS. 6A, 6B, and 6C, and FIG. 7. In some examples, the signal bearing medium 802 can be a computer-readable medium 806, such as, but not limited to, a hard disk drive, a Compact Disc (CD), a Digital Video Disk (DVD), read-only memory (ROM), random-access memory (RAM), flash memory, a digital tape, memory, etc. In some implementations, the signal bearing medium 802 can be a computer recordable medium 808, such as, but not limited to, memory, read/write (R/W) CDs, R/W DVDs, etc. In some implementations, the signal bearing medium 802 can be a communication medium 810 (e.g., a fiber optic cable, a waveguide, a wired communications link, etc.). Thus, for example, the signal bearing medium 802 can be conveyed by a wireless form of the communications medium 810.

The one or more program instructions 804 can be, for example, computer executable and/or logic implemented instructions. In some examples, a computing device is configured to provide various operations or actions in response to the program instructions 804 conveyed to the computing device by the computer readable medium 806, the computer recordable medium 808, and/or the communications medium 810. In other examples, the computing device can be an external device in communication with a device coupled to the robotic device.

The computer readable medium 806 can also be distributed among multiple data storage elements, which could be remotely located from each other. The computing device that executes some or all of the stored instructions could be an external computer, or a mobile computing platform, such as a smartphone, tablet device, personal computer, or a wearable device, among others. Alternatively, the computing device that executes some or all of the stored instructions could be a remotely located computer system, such as a server. For example, the computer program product 800 can implement operations discussed in the description of FIG. 5.

The arrangements described herein are for purposes of example only. As such, those skilled in the art will appreciate that other arrangements and other elements (e.g., machines, interfaces, operations, tasks, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    receiving, by a machine having a first leg and a second leg, a first measurement indicative of a first distance along a first direction from a center of mass of the machine to a first position of the first leg when the first leg initially contacts a surface during a first stance period, the first stance period commencing when the first leg initially contacts the surface at the first position;
    receiving, by the machine, a second measurement indicative of a second distance along an opposite second direction from the center of mass of the machine to a second position of the first leg when the first leg initially raises from the surface during the first stance period, the first stance period terminating when the first leg initially raises from the surface;
    determining, by the machine, a third distance along the first direction from the center of mass of the machine for placing the second leg in contact with the surface at a third position during a second stance period based on the received first measurement and the received second measurement, the second stance period commencing after the first stance period terminates; and
    providing instructions to move the second leg of the machine to the third position during the second stance period.

2. The method of claim 1, further comprising:
    receiving a bias value indicative of a desired influence on a direction in which the machine is moving, wherein the third distance along the first direction from the center of mass to the third position is also determined based on the received bias value to adjust the direction in which the machine is moving according to the desired influence.

3. The method of claim 1, further comprising:
    receiving a bias value that influences a yaw-heading velocity direction of the center of mass of the machine, wherein the third position distance along the first direction from the center of mass to the third position is also determined based on the received bias value.

4. The method of claim 1, wherein the surface at the second position is at a first height, wherein the surface at the third position is at a second height, and wherein the first height is not equal to the second height.

5. The method of claim 1, wherein determining the third distance comprises:
    estimating a velocity of the machine based on a difference between the first measurement and the second measurement;
    estimating an acceleration of the machine based on a sum of the first measurement and the second measurement; and
    determining the third distance from center of mass for placing the second leg in contact with the surface at the third position during the second stance period based on a linear combination of the estimated velocity and the estimated acceleration.

6. The method of claim 5, wherein determining the third distance from center of mass for placing the second leg in contact with the surface at the third position during the second stance period based on a linear combination of the estimated velocity and the estimated acceleration comprises:
    determining a scaled velocity by multiplying the estimated velocity by a first scaling factor;
    determining a scaled acceleration by multiplying the estimated acceleration by a second scaling factor; and
    determining the third distance from center of mass for placing the second leg in contact with the surface at the third position during the second stance period position in which to place the as a sum of the scaled velocity and the scaled acceleration.

7. The method of claim 5, wherein determining the third distance comprises:
- determining a path in which the machine is expected to travel based on the estimated velocity and the estimated acceleration;
- determining whether the machine is expected to collide with an object based on the determined path; and
- determining the third distance from center of mass for placing the second leg in contact with the surface at the third position during the second stance period to avoid colliding with the object based on the received first measurement and the received second measurement.

8. The method of claim 5, wherein determining the third position distance comprises:
- providing a velocity value indicative of a desired speed of the machine, wherein the velocity value is different from the estimated velocity of the machine; and
- determining the third distance from center of mass for placing the second leg in contact with the surface at the third position during the second stance period based on the received first measurement, the received second measurement, and the provided velocity value.

9. The method of claim 1, wherein the first measurement takes place at a first time during the first stance period, wherein the second measurement takes place at a second time during the first stance period, and wherein the second time occurs after the first time.

10. The method of claim 9, further comprising:
- providing a velocity value indicative of a desired speed of the machine;
- determining a third time during the second stance period to move the second leg of the machine to the third position based on the provided velocity value; and
- providing instructions to move the second leg of the machine to the third position at the determined third time.

11. The method of claim 1, further comprising:
- determining, by the machine, a fourth distance along a third direction from the center of mass of the machine for placing the second leg in contact with the surface at the third position during the second stance period based on at least the received first measurement and received second measurement, the third direction perpendicular to the first direction and the second direction; and
- determining a two-dimensional position based on (i) the determined third distance of the third position of the second leg from the center of mass along the first direction, and (ii) the determined fourth distance of the third position of the second leg from the center of mass along the third direction; and
- providing instructions to move the second leg of the machine to the determined two-dimensional position during the second stance period.

12. The method of claim 1, further comprising:
- determining, by the machine, a force for the second leg to apply to the surface at the third position; and
- providing instructions to move the second leg of the machine to the third position and to apply the determined force to the surface during the second stance period.

13. The method of claim 1, wherein determining the third distance comprises determining damping values indicative of a rate in which the machine suppresses perturbations caused by external forces, and wherein the third distance is also determined based on the damping values.

14. The method of claim 1, further comprising:
- receiving, by the machine, an indication of an object in front of the machine; and
- providing instructions to stop the machine responsive to receiving the indication of the object in front of the machine.

* * * * *